US008215489B1

(12) United States Patent  
Roberts et al.

(10) Patent No.: US 8,215,489 B1
(45) Date of Patent: Jul. 10, 2012

(54) METHOD AND APPARATUS FOR PHYSICAL SEPARATION OF DIFFERENT SIZED NANOSTRUCTURES

(75) Inventors: Christopher B. Roberts, Auburn, AL (US); Steven R. Saunders, Auburn, AL (US)

(73) Assignee: Auburn University, Auburn, AL (US)

( * ) Notice: Subject to any disclaimer, the term of this patent is extended or adjusted under 35 U.S.C. 154(b) by 256 days.

(21) Appl. No.: 12/610,120

(22) Filed: Oct. 30, 2009

Related U.S. Application Data

(60) Provisional application No. 61/197,916, filed on Oct. 31, 2008.

(51) Int. Cl.
*B07B 4/00* (2006.01)

(52) U.S. Cl. ........ 209/133; 209/142; 209/659; 209/712; 20/651; 20/768

(58) Field of Classification Search .................. 209/133, 209/142, 659, 712
See application file for complete search history.

(56) References Cited

U.S. PATENT DOCUMENTS

| | | | | |
|---|---|---|---|---|
| 5,360,554 A | * | 11/1994 | Sloan et al. .................. | 210/768 |
| 5,606,724 A | | 2/1997 | Wai et al. | |
| 6,113,795 A | * | 9/2000 | Subramaniam et al. ...... | 210/651 |
| 6,958,308 B2 | | 10/2005 | Brown | |
| 7,384,879 B2 | * | 6/2008 | Roberts et al. ................ | 438/758 |
| 7,744,923 B2 | * | 6/2010 | Rajewski et al. ............. | 424/489 |
| 2010/0323527 A1 | | 12/2010 | Roberts et al. | |

FOREIGN PATENT DOCUMENTS

| | | |
|---|---|---|
| GB | 2322326 A | 8/1998 |
| WO | 9629998 | 10/1996 |
| WO | 03006223 A1 | 1/2003 |

OTHER PUBLICATIONS

Parag S. Shah et al., "Role of Steric Stabilization on the Arrested Growth of Silver Nanocrystals in Supercritical Carbon Dioxide", J. Phys. Chem B, vol. 106, No. 47, 2002, pp. 12178-12185.
DelRio et al., "The Effect of nanoparticles on rough surface adhesion," Journal of Applied Physics, 2006, vol. 99, pp. 104304-1 through 104304-9.
Adair et al., "Recent developments in the preparation and properties of nanometer-size spherical and platelet-shaped particles and composite particles," Materials Science and Engineering, 1998, R23, pp. 139-242.
Turkevich et al., "The color of colloidal gold," Journal of Colloid Science, 1954, vol. 9, Supp. 1, pp. 26-35.
Frens, G., "Controlled Nucleation for the Regulation of the Particle Size in Monodisperse Gold Suspensions," Nature Physical Science, 1973, vol. 241, pp. 20-22.

(Continued)

*Primary Examiner* — Terrell Matthews
(74) *Attorney, Agent, or Firm* — Haverstock & Owens LLP

(57) ABSTRACT

The present application provides apparatuses and methods for the size-selective fractionation of ligand-capped nanoparticles that utilizes the tunable thermophysical properties of gas-expanded liquids. The nanoparticle size separation processes are based on the controlled reduction of the solvent strength of an organic phase nanoparticle dispersion through increases in concentration of the antisolvent gas, such as $CO_2$, via pressurization. The method of nanomaterial separation contains preparing a vessel having a solvent and dispersed nanoparticles, pressurizing the chamber with a gaseous antisolvent, and causing a first amount of the nanoparticles to precipitate, transporting the solution to a second vessel, pressurizing the second vessel with the gaseous antisolvent and causing further nanoparticles to separate from the solution.

17 Claims, 12 Drawing Sheets

OTHER PUBLICATIONS

Jana et al., "Seeding Growth for Size Control of 5-40 nm Diameter Gold Nanoparticles," Langmuir, 2001, vol. 17, pp. 6782-6786.

Liu et al., "Precise Seed-Mediated Growth and Size-Controlled Synthesis of Palladium Nanoparticles Using a Green Chemistry Approach," Langmuir, 2009, vol. 25, No. 12, pp. 7116-7128.

Fischer et al., "Photochemistry of Colloidal Semiconductors. 30. HPLC Investigation of Small CdS Particles.," Langmuir, 1989, vol. 5, pp. 429-432.

Jimenez et al., "HPLC of Monolayer-Protected Gold Nanoclusters," Analytical Chemistry, 2003, vol. 75, pp. 199-206.

Arnaud et al., "Size-selective separation of gold nanoparticles using isoelectric focusing electrophoresis (IEF)," Chemical Communications, 2005, pp. 787-788.

Hanauer et al., "Separation of Nanoparticles by Gel Electrophoresis According to Size and Shape," Nano Letters, 2007, vol. 7, No. 9, pp. 2881-2885.

Sweeney et al., "Rapid Purification and Size Separation of Gold Nanoparticles via Diafiltration," Journal of American Chemical Society, 2006, vol. 128, pp. 3190-3197.

Murray et al., "Synthesis and Characterization of Monodisperse Nanocrystals and Close-Packed Nanocrystal Assemblies," Annual Review of Materials Science, 2000, vol. 30, pp. 545-610.

Murray et al., "Synthesis and Characterization of Nearly Monodisperse CdE (E = S, Se, Te) Semiconductor Nanocrystallites," Journal of American Chemical Society, 1993, vol. 115, 8706-8715.

Eckert et al., "Tuning Solvents for Sustainable Technology," Industrial & Engineering Chemistry Research, 2000, vol. 39, pp. 4615-4621.

McLeod et al., "Precise and Rapid Size Selection and Targeted Deposition of Nanoparticle Populations Using CO2 Gas Expanded Liquids," Nano Letters, 2005, vol. 5., No. 3, pp. 461-465.

Anand et al., "Finely Controlled Size-Selective Precipitation and Separation of CdSe/ZnS Semiconductor Nanocrystals Using CO2-Gas-Expanded Liquids," Langmuir, 2007, vol. 23, No. 13, pp. 7338-7343.

Shah et al., "Size-Selective Dispersion of Dodecanethiol-Coated Nanocrystals in Liquid and Supercritical Ethane by Density Tuning," Journal of Physical Chemistry B, 2002, vol. 106, pp. 2545-2551.

Shah et al., "Role of Steric Stabilization on the Arrested Growth of Silver Nanocrystals in Supercritical Carbon Dioxide," Journal of Physical Chemistry B., 2002, vol. 106, pp. 12178-12185.

Kitchens et al., "Solvent Effects on the Growth and Steric Stabilization of Copper Metallic Nanoparticles in AOT Reverse Micelle Systems," Journal of Physical Chemistry B, 2003, vol. 107, pp. 11331-11338.

Sassiat et al., "Measurement of Diffusion Coefficients in Supercritical Carbon Dioxide and Correlation with the Equation of Wilke and Chang," Analytical Chemistry, 1987, vol. 59, pp. 1164-1170.

Brust et al., "Synthesis of Thiol-derivatised Gold Nanoparticles in a Two-phase Liquid-Liquid System," Journal of Chemical Society, Chemical Communications, 1994, pp. 801-802.

Sigman et al., "Metal Nanocrystal Superlattice Nulceation and Growth," Langmuir, 2004, vol. 20, pp. 978-983.

Jessop et al., "Gas-Expanded Liquids," Chemistry Review, 2007, vol. 107, pp. 2666-2694.

Anand et al., "Tunable Solvation Effects on the Size-Selective Fractionation of Metal Nanoparticles in CO2 Gas-Expanded Solvents," Journal of Physical Chemistry B, 2005, vol. 109, No. 48, pp. 22852-22859.

Anand et al., "Thermodynamic Analysis of Nanoparticle Size Selective Fractionation Using Gas-Expanded Liquids," Industrial & Engineering Chemistry Research, 2008, vol. 47, No. 3, pp. 553-559.

Kho et al., "Phase equilibria and thermophysical properties of carbon dioxide-expanded fluorinated solvents," Fluid Phase Equilibria, 2003, vol. 206, pp. 179-193.

Wilcoxon et al., "Photoluminescence from nanosize gold clusters," Journal of Chemical Physics, 1998, vol. 108, No. 21, pp. 9137-9143.

Maxey, N.B., "Transport and phase transfer catalysis in gas-expanded liquids," Georgia Institute of Technology, 2006.

\* cited by examiner

METHOD AND APPARATUS FOR PHYSICAL SEPARATION OF DIFFERENT SIZED NANOSTRUCTURES

U.S. GOVERNMENT AGENCY AND THE GOVERNMENT CONTRACT

The invention was made by an agency of the United States Government or under a contract with an agency of the United States Government. The name of the U.S. Government agency and the Government contract number are: DOE-National Energy Technology Laboratory Grant No. DE-FG26-06NT42685.

CROSS-REFERENCE TO RELATED APPLICATIONS

This application claims priority from U.S. Provisional Patent Application Ser. No. 61/197,916, filed Oct. 31, 2008 and entitled "Method and Apparatus for Physical Separation of Different Sized Nanostructures"; which is hereby incorporated herein by reference in its entirety for all purposes. Further, U.S. Pat. No. 7,384,879 issued on Jun. 10, 2008 titled "SELECTION AND DEPOSITION OF NANOPARTICLES USING $CO_2$-EXPANDED LIQUIDS," U.S. patent application Ser. No. 12/082,189, filed on Apr. 8, 2008, titled "SELECTION OF NANOPARTICLES USING $CO_2$-EXPANDED LIQUIDS," and U.S. Provisional Patent Application Ser. No. 61/002,349, filed on Nov. 7, 2007, titled METHOD AND APPARATUS FOR DEPOSITING NANOPARTICLES ON MEMS DEVICES are all hereby incorporated by reference in their entireties for all purposes.

FIELD OF THE INVENTION

The present invention relates to the field of nano material separation. More specifically, the present invention relates to the field of nano material separation using a solvent mixed with a compressed gas (gas expanded liquid).

BACKGROUND OF THE INVENTION

Materials with nanoscale dimensions exhibit very unique mechanical, chemical, magnetic, electronic, and optical properties which are found neither at bulk scales nor at the molecular scale. These unique properties are often found to be highly dependent on the size of the nanoparticles, and as such, obtaining monodisperse samples of nanoparticles of a desired size is of the utmost importance for certain applications and fundamental studies. While it is possible to synthesize monodisperse nanoparticles, most notably through controlled growth methods (e.g. citrate reduction and seeded growth), these methods are typically tailored for a particular material and produce low-concentration, aqueous dispersions of nanoparticles which are challenging to process. Thus, post-processing methods for obtaining monodisperse fractions are required that will be applicable to many different types of materials and that offer higher throughputs. Current post-processing methods used to obtain monodisperse fractions from polydisperse samples include size-exclusion liquid chromatography, high-pressure liquid chromatography, isoelectric focusing electrophoresis, gel electrophoresis, and diafiltration. However, each of these methods require expensive and specialized equipment and provide relatively low throughput.

A typical technique used to size-selectively fractionate nanoparticles involves the use of a liquid solvent-antisolvent fractionation through an induced precipitation which requires centrifugation and can produce large quantities of organic waste. At application relevant processing scales (greater than milligram quantities), centrifugation is inefficient and expensive and large quantities of organic waste would be expensive to dispose of or require large amounts of energy to separate, thus making a liquid solvent-antisolvent a non-optimal solution.

SUMMARY OF THE INVENTION

The present application provides apparatuses and methods for the size-selective fractionation of ligand-capped nanoparticles that utilizes the tunable physico-chemical properties of gas-expanded liquids (GXLs). GXLs are mixtures of an organic solvent and a pressurized gas. In these systems, an organic solvent (e.g. hexane) is pressurized with a gas (e.g. $CO_2$) where the gas partitions, or dissolves, into the liquid phase to create a solvent mixture at greater than atmospheric pressure but less than the vapor pressure of the pure gas. At lower pressures, very little gas is dissolved in the organic phase, however with increases in the applied pressure of the gas, the volume of the liquid phase drastically increases due to the increased solubility of the gas. The composition and physico-chemical properties (density, viscosity, diffusivity, solvent strength, and surface tension) of the solvent mixtures can be easily tuned between those of the organic solvent and those of the pure gas by simply varying the applied pressure of the gas. An advantage of using these systems involves the recovery and recycling of both the organic phase and the gas through simple depressurization.

The nanoparticle size separation processes are able to use the principles of the GXLs to achieve controlled reduction of the solvent strength of an organic phase nanoparticle dispersion through increases in concentration of the antisolvent gas, for example $CO_2$, via pressurization. These changes in solvent strength affect the subtle balance between the osmotic forces of the repulsion that originate from the solvation of the nanoparticle ligand tails and the van der Waals forces of attraction between different sized particles necessary for a stable dispersion. As such, increasingly smaller sizes of particles are able to be controllably precipitated from the dispersion through modest increases in gas pressure, resulting in the separation of the particle dispersions by size. For example, a typical separation method results in a fractionation of a dispersion ranging from 2 nm to 12 nm into +1-1 nm fractions. In a related patent application, $CO_2$ was used as an antisolvent in a gas-expanded hexane system to size-selectively precipitate ligand (dodecanethiol and tri-n-octylphosphine oxide) stabilized metal and semiconductor nanoparticles into narrow sized fractions through simple variations in applied $CO_2$ pressure. Nanoparticles disperse in a solvent when the solvent-ligand interaction provides a sufficient repulsive force (osmotic repulsive force due to the solvation of the ligand tail by the solvent) to overcome the inherent van der Waals attractive forces between the ligand-stabilized nanoparticles. The degree of solvent-ligand interaction can be reduced upon the gradual addition of $CO_2$, a known nonsolvent (antisolvent) for nonpolar, aliphatic ligands, through pressurization, thereby enabling gradual size-dependent precipitation of the nanoparticles. The magnitude of the van der Waals attractive force between nanoparticles scales with the square of the nanoparticle diameter and thus the largest nanoparticles will precipitate first upon worsening solvent conditions (e.g. upon addition of $CO_2$). By precisely adjusting the applied $CO_2$ pressure, the dispersability of nanoparticles can be controlled to obtain increasingly smaller-sizes nanoparticles fractions with increasing $CO_2$ pressure applied to the organic solvent mixture. Due to the fact that the GXL solvent mixture's properties lie between those of the gas and those of the solvent, the addition of $CO_2$ reduces the viscosity and increases the diffusivity of the nanoparticle through the medium, thereby allowing precipitation to occur rapidly without the need for centrifugation. This concept can be illustrated through the use of a Archimedes-type open-ended spiral-tube placed inside a high pressure vessel within which a polydisperse sample of ligand-stabilized metallic (gold and silver) or semiconductor (CdSe/ZnS) nanoparticles are able to be fractionated into narrow-sized distributions (±1 nm) using the GXL solvent-antisolvent system. The spiral-tube apparatus (glass tube with a concentric, spiral indentation inside a stainless-steel high pressure vessel) was fabricated to allow for the collection of nanoparticle fractions from an initially polydisperse population. The indented channel, or groove, allows for a small volume, such as 0.2 μL (0.2 mg), of a nanoparticle dispersion to rest within a specific area of the tube and easily traverse the length of the spiral channel by rotating the tube about a lateral axis. The high pressure apparatus was repeatedly pressurized with $CO_2$ to precipitate the nanoparticles and the spiral-tube rotated externally 180° to separate the remaining dispersion from the precipitated particles which were affixed to the glass surface.

In order to produce application-scale quantities (greater than milligram quantities) of nanoparticles with a targeted mean diameter and size distribution, the present application presents a newly designed apparatus that would provide an effective separation at larger scales in a configuration that lends itself to further scale-up and valuable applications in industrial processes of nanoparticle manufacturing, such as continuous-flow of nanomaterial productions.

Further, the present application provides methods and apparatuses for scaling up the capability to handle larger quantities for applications such as catalysts, sensors, semiconductors, and optics. In some embodiments, three vertically mounted high pressure vessels coupled or connected with high pressure needle valves that allow for sequential isolation and separation of the fractionated nanoparticle dispersion. In some embodiments, the process of the present application is able to be operated at room temperature and pressure between atmospheric and 700 psi. In some embodiments, the pressure source of the carbon dioxide is able to directly come from a commercially available carbon dioxide tank, which is generally capable of outputting up to 860 psi. Accordingly, the system of the present application is able to be operated without additional pressure pumps, such as syringe pumps. Pressure pumps are normally expensive. A nanoparticle separation system without a need to use pressure pumps would substantially reduce the cost of constructing the system, which would be useful and welcomed by the industrial applications.

The methods and apparatuses of the present application have been used to achieve a successful size-selective separation of ~20 mL (300 mg) nanoparticle dispersion. The processed mass of the sample solution demonstrated in the present application is 1000 times larger than the sample solution that is used in the spiral tube apparatus within a high pressure vessel. The methods and apparatus provided in the present application are able to be easily modified by increasing the number of the vessels or by increasing the size of the vessels allowing for more fractions or separation of larger samples respectively.

Some aspects and embodiments of the present invention are included in the following sections. In some aspects, a nanomaterial separation method is provided. The nanomaterial separation method comprises preparing a first chamber containing a solvent and dispersed nanoparticles, pressurizing the first chamber with a gaseous antisolvent at a first pressure thereby causing a first portion of the nanoparticles to separate from a second portion of the nanoparticles, transporting at least some of the second portion of the nanoparticles to a second chamber, and pressurizing the second chamber fluidly coupled to the first chamber with the gaseous antisolvent at a second pressure, thereby causing at least some of the second portion of the nanoparticles to separate from a third portion of the nanoparticles. In some embodiments, the third portion of the nanoparticles are transported away from the second portion of the nanoparticles. In some embodiments, the first and the second chambers are individually sealable.

In some embodiments, the first chamber and the second chamber are individually detachable vessels. In alternative embodiments, the solvent comprises a liquid solvent. In other embodiments, the antisolvent comprises carbon dioxide. In some embodiments, an arrangement of the first and the second vessel allows the gravity of earth to transfer majority of a solution from the first chamber to the second chamber. In alternative embodiments, the second pressure is higher than the first pressure. In other embodiments, the first chamber comprises a solution having a higher solvent strength than a solution in the second chamber. In some embodiments, the method further comprises pressurizing a third individually sealable chamber with the antisolvent at a third pressure thereby causing at least some of the third portion of the nanoparticle to separate from a fourth portion. In other embodiments, a size of the majority of the nanoparticles of the first portion are larger than the size of the majority of the nanoparticles of the second portion. In alternative embodiments, a size of the majority of the nanoparticles of the second portion is larger than a size of the majority of the nanoparticles of the third portion. In other embodiments, the first, the second, and the third pressures are lower than or equal to 860 psi of carbon dioxide. In some embodiments, the method further comprises re-dispersing the first portion or a second portion of the nanoparticles into a nanoparticle disperseable solution, thereby generating a re-dispersed nanoparticle solution. In alternative embodiments, the nanoparticle disperseable solution is the solvent. In other embodiments, the solvent is hexane. In some embodiments, the re-dispersed nanoparticle solution is pressurized to the first or the second pressure. In other embodiments, the pressures are between 0 psi to 860 psi of carbon dioxide.

In some alternative aspects of the present invention, a nanomaterial separation system is provided. The nanomaterial separation system comprises a first and a second individually sealable chambers and a solution of nanoparticles dispersed in a liquid solvent within the first individually sealable chamber, wherein the solvent is expandable by a gaseous antisolvent, thereby a first selected portion of the nanoparticles are capable of precipitating at a first pre-determined pressure of the gaseous antisolvent.

In some embodiments, the first and the second individually sealable chambers are capable of being individually pressurized. In alternative embodiments, the first and the second individually sealable chambers are individually detachable. In other embodiments, the system further comprises a valve between the first and the second individually sealable and detachable chambers. In some embodiments, the solution of nanoparticles is able to precipitate a second selected portion of the nanoparticles at a second pre-determined pressure of the gaseous antisolvent in the second sealable chamber. In alternative embodiments, the antisolvent comprises carbon dioxide. In other embodiments, the first and the second individually sealable chambers are arranged in a way allowing gravity of the earth to transfer the solution from the first chamber to the second chamber.

In other aspects of the present invention, a nanomaterial separation apparatus is provided. The nanomaterial separation apparatus comprises a first nanoparticle separation chamber, a second nanoparticle separation chamber fluidly coupled with the first nanoparticle separation chamber, wherein the first nanoparticle separation chamber is detachable from the second nanoparticle separation chamber, a solvent strength adjustable solution comprising at least two nanoparticles, and a gas capable of adjusting the solvent strength of the solution, wherein the gas is capable of controlling the isolation of at least one of the nanoparticles in either the first or the second nanoparticle separation chamber.

In some aspects of the present invention, a nanomaterial separation method is provided. The nanomaterial separation method comprises reducing a solvent strength to a first degree by a gas in a first vessel thereby generating a first isolated nanoparticle and reducing the solvent strength to a second degree by the gas in a second vessel, thereby generating a second isolated nanoparticle, wherein the first vessel is detachable from the second vessel. In some embodiments, the first and the second vessels are independently sealable.

In some aspects of the present invention, a nanoparticle separation system is provided. The nanoparticle separation system comprises a cascade arrangement of a plurality of individually sealable vessels, a channel coupling at least two of the plurality of the individually sealable vessels, and a solution containing nanoparticles and an amount of pressurized gas molecules, wherein the amount of pressurized gas molecules in the solution is different when the solution is located at different vessels of the plurality of individually sealable vessels, thereby making the solution capable of eliminating different size range of nanoparticles from the solution at the different vessel.

In other aspects of the present invention, a nanoparticle separation method is provided. The nanoparticle separation method comprises preparing a solution containing nanoparticles of different sizes, retaining a first size range of nanoparticles in a vessel by increasing a first volume of a solution, wherein the first volume of the solution becomes a second volume, and retaining a second size range of the nanoparticles in a separate vessel by changing the second volume, wherein the volumes are increased by adding a first fluid with a second fluid, wherein the first and the second fluid form a homogeneous fluid.

DETAILED DESCRIPTION OF THE PREFERRED EMBODIMENT

Methods and apparatuses for precise, rapid and improved separation of nanoparticles by size relies on a solvent/antisolvent method that uses a gaseous antisolvent to create a tunable gas expanded liquid are provided. The antisolvent is carbon dioxide ($CO_2$) in some embodiments. Pressurized gaseous antisolvent is placed over a nanoparticle solution. By changing the pressure of the antisolvent, the resulting fraction of antisolvent in the solution is able to be increased or decreased. Given that particle dispersibility is a function of antisolvent in the liquid, particles of any given target sizes are able to be made to precipitate by simple manipulation of the antisolvent pressure. Multiple monodisperse particle populations are able to be rapidly fractionated by adjusting only the antisolvent pressure and the liquid location, thereby eliminating the difficulties associated with traditional methods that are time and solvent intensive, expensive, and/or have limited throughput.

Figure 1:
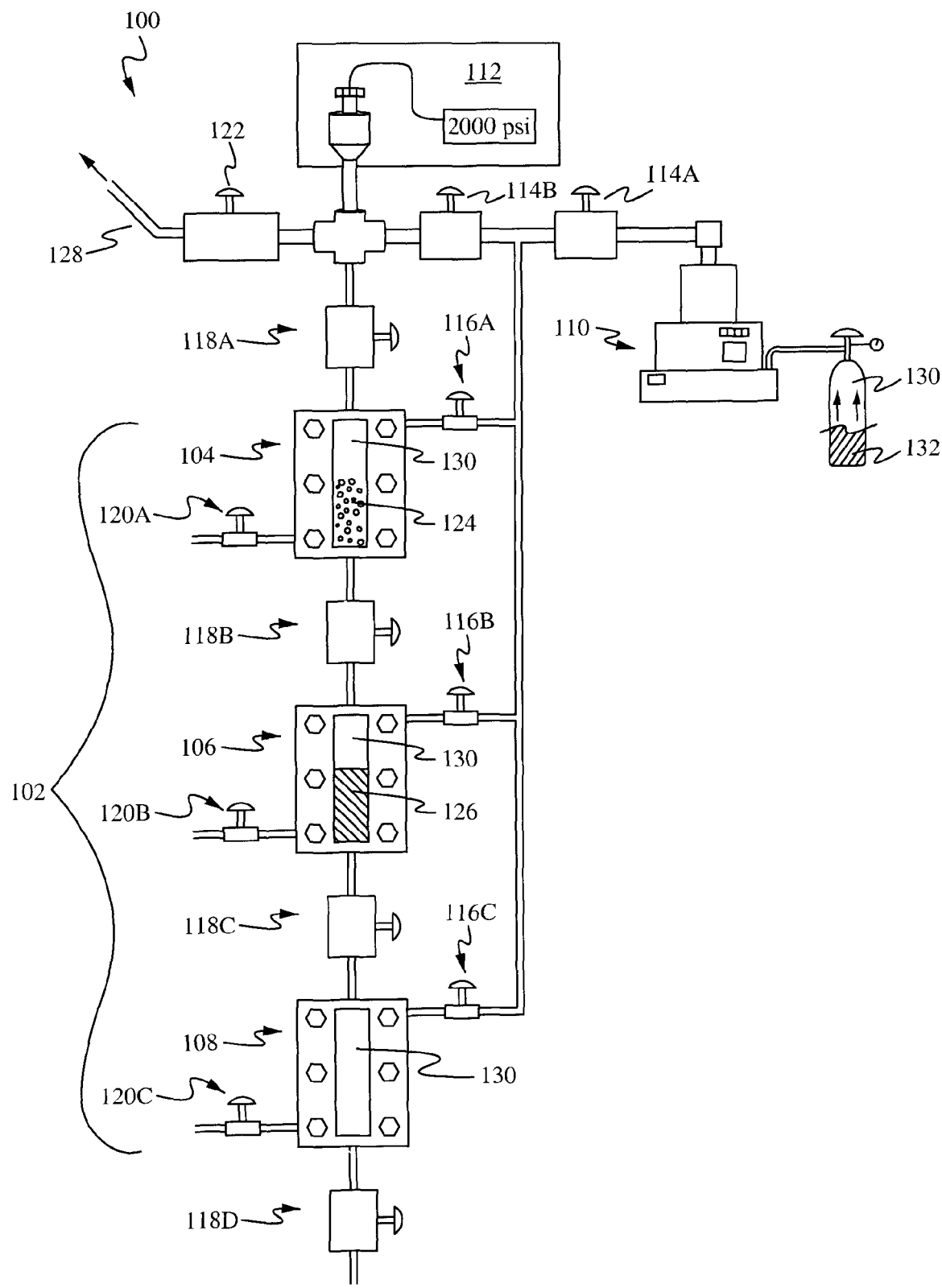
FIG. 1 shows a general setup of the nano material separation system 100 in accordance with some embodiments.

FIG. 1 shows a general setup of the nano material separation system 100 in accordance with some embodiments. In some embodiments, the nano material separation system 100 comprises a separation section 102, a pressure measurement section 112, fluid supply device 110 and various valves, such as valves 114, 116, 118, 120 and 122. In some embodiments, the fluid supply device 110 is a syringe pump, which connects to a gas supply 130. In some embodiments, the gas supply contains antisolvent fluids, such as carbon dioxide. In some embodiments, a gas pump is not used. The source of antisolvent or gas is able to come from a gas tank directly.

In some embodiments, the separation section 102 contains vessels 104, 106, and 108. The vessels 104, 106, and 108 are vessels capable of sustaining high pressures and temperatures. For example, an applied pressure and temperature close to or beyond a critical point of the antisolvents or an expanded solution. In some embodiments, the vessels 104, 106, and 108 are made of steel or stainless steel. In some embodiments, the vessels 104, 106, and 108 contain viewing windows 130. A person of ordinary skill in the field would appreciate that the numbers, types, pressure limits, materials, and any other properties of the vessels 104, 106, and 108 are variable to fit for the needs of some embodiments. For example, glass linings are able to be placed inside the vessels 104, 106, 108 to prevent the nanoparticles from reacting with the surface of the vessels. A person ordinary skilled in the art would appreciate that any coating and inner surface are able to be used. Similarly, the valves described in the present application are also variable to fit the purpose of controlling the transport of the fluids and solids.

The carbon dioxide mentioned in the present application is able to be supercritical fluid (ScF) grade, industrial grade, or any other carbon dioxide sources. The antisolvent fluids are able to be any substances that facilitate the precipitation of the nanomaterial from the solvent/solution. In some embodiments, the antisolvent fluid is less polar than the solvent. In some cases, the antisolvent fluid has a dielectric constant lower than the dielectric constant of the solvent. In some embodiments, the antisolvent has no dipole moment and little self interaction. In some embodiments, the term solvent used herein contain a fluid that dissolves or allows the dispersion of the nanomaterial therein. In some embodiments, the solvents are organic solvents such as, alkanes, alkenes, and alkynes. In other embodiments, the solvents are inorganic solvents or ionic solvents, such as 1-butyl-3-methylimidazolium (BMIM) salt. The term "fluid" used herein comprises substances that are in a fluid state when it is added to the solvent. The chemical substance is able to be in other physical states when the solubility is not at issue. For example, the solvent is able to be in solid state when it is not used to dissolve or disperse the nanomaterials. The nanomaterials are able to be substances approximately in the range of nano-meter. A person of ordinary skill in the field would appreciate that the term nanomaterial is able to include nano-structures, nano-particles, nano-spheres, nano-tubes, nano-rods, quantum dot, nano-dusts, or any other substance that possesses the physical and chemical qualities that are normally considered as nano materials/nano-particles. In some embodiments, the nano materials contain various metals and alloys, such as gold and silver nano materials.

Figure 2:
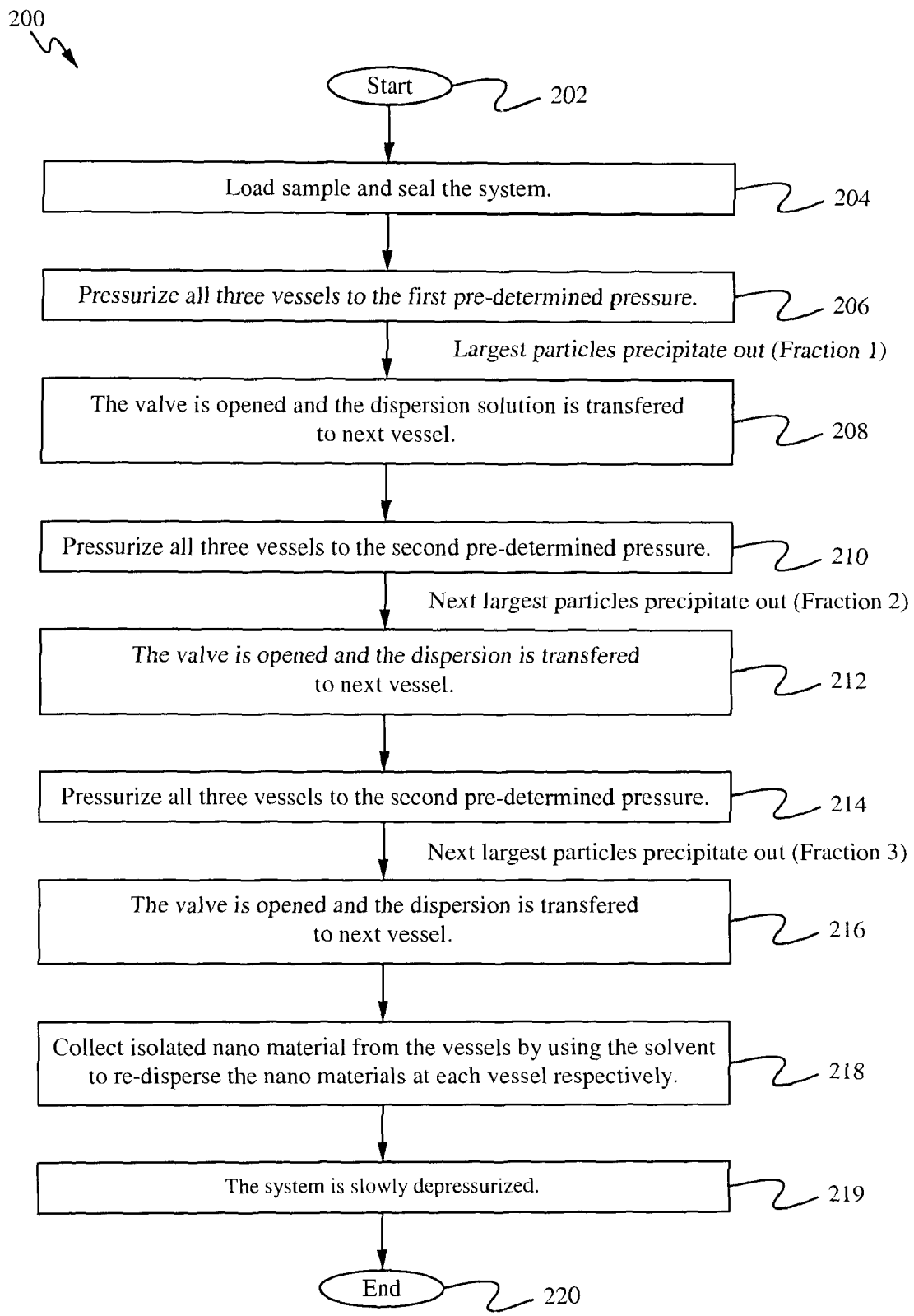
FIG. 2 is a flow chart illustrating a nano material separation method 200 in accordance with some embodiments.

FIG. 2 is a flow chart illustrating a nanomaterial separation method 200 in accordance with some embodiments of the present application. The nanomaterial separation method 200 begins from a Step 202. At Step 204, an amount of a sample is loaded into the separation vessel 104 (FIG. 1) and the nano material separation system 100 (FIG. 1) is sealed. At Step 206, all or part of the vessels is pressurized with the antisolvent to a first pre-determined pressure. A group of the nano-materials, which contains the predetermined property, is precipitated. The precipitation makes the isolation of desired nanomaterials possible, because some physical or chemical separatable or distinguishable phases occur between the dissolved or dispersed nanomaterials and precipitated nanomaterials. In some embodiments when sizes of the nanomaterials are used as the controlled factor for separation, the group that has the largest average size nanomaterial precipitates first, because the reduction of the solvent strength affects large size nanomaterial more than the small size nanomaterial. At Step 208, the valve is opened and the sample is transferred to a next vessel after a predetermined period, such as twenty minutes. In some embodiments, the nanomaterial separation system 100 is used and valve 118B (FIG. 1) is opened and the gravity of earth pulls the sample solution from the vessel 104 to the vessel 106 leaving the precipitated nanomaterial 124 left in the vessel 104. At Step 210, all or some of the vessels are pressurized to a second pressure by adding the pressurized antisolvent. In some embodiments when sizes of the nano-materials are used as the controlled factor for separation, the group that has the middle average size nanomaterial precipitates at this stage. In some embodiments, the second pressure is higher than the first pressure. In other embodiments, the antisolvent is able to be a gas different from the antisolvent added to generate the first pressure. For example, the first pressure is able to be generated by adding carbon dioxide and the second pressure is able to be generated by adding hexafluorobenzene gas. A person of ordinary skill in the art would appreciate that different types, pressures, physical properties, and chemical properties of the antisolvents are able to be used. Further, a person of ordinary skill in the art will appreciate that the systems that are described in the present application are embodiments of the present invention. At Step 212, the valve is opened and the sample is transferred to a next vessel after a predetermined period, such as twenty minutes. In some embodiments, the nanomaterial separation system 100 is used and valve 118C (FIG. 1) is opened allowing the gravity of earth to pull the sample solution to transfer from the vessel 106 to the vessel 108 leaving the precipitated nanomaterial left in the vessel 106. At Step 214, all or some of the vessels are pressurized to a third pressure by adding the antisolvent. In some embodiments, the third pressure is higher than the second pressure and the first pressure. In some embodiments when sizes of the nanomaterials are used as the controlled factor for separation, the group that has the smallest average size nanomaterial precipitates at this stage. At Step 216, the sample solution is transferred to the receiving container. The solution is able to be used to further isolate the remaining nanomaterial or combined with other batches of samples. At Step 218, the system 100 is slowly depressurized. At Step 219, the isolated nanomaterials are collected from the vessels by using fresh solvent to re-disperse the nanomaterials at each vessel respectively. The method ends at a Step 220 in some embodiments.

Various properties or characteristics of the nanomaterials are able to be used as the controlled factor for separation in accordance with some embodiments of the present invention. For example, the size of the nanomaterials is able to be used as a controlled factor for separation. Table 1 illustrates an example of separating the nanomaterials using the nanomaterial separation method 200 and the system 100 of the present application based on the size differences of the nano-materials. As shown in Table 1, the original nanomaterial sample contains 20 mL of a solvent (e.g. hexane) and nano-materials having an average size of 5.59 nm in diameter. The vessels are pressurized with carbon dioxide, an antisolvent in this case, at three different pressure levels into the original sample, which contains solvent and nanomaterial having an average size of 5.59 nm in diameter. At a first stage, the vessel is pressurized with carbon dioxide up to 625 psi into the sample solution. The nanomaterials having an average diameter of 7.00 nm are precipitated. The remaining sample solution is transferred into a next detachable and independent sealable separation vessel. In some embodiments, transfer is performed by opening the valve and allowing the gravity to pull the remaining solution into the next vessel. At a second stage, the vessels are pressurized with carbon dioxide further from 625 psi to 650 psi as applied to the sample solution. The nanomaterials having a 4.35 nm average diameter are precipitated. The nanomaterials not capable of being precipitated at 650 psi have an average diameter of 3.95 nm. In some embodiments, the nanomaterials described above are able to be gold nanoparticles prepared using the methods and materials described in the experimental section.

In some embodiments, the nanomaterials collected at each stage are saved for further recursive fractionation. For example as shown in Table 1, the nanomaterials collected at the second stage having an average 4.35 nm in diameter with 21.7% relative standard deviation is further fractionated to have narrower size distribution of the nanomaterials. As a result, the nanomaterials having an average diameter of 4.50 nm with 19.8% relative standard deviation is obtained after the recursive fractionation. A better relative standard deviation with 18.1% is obtained when a further recursive fractionation is performed. Accordingly, the repetitions of the recursive fractionations are able to make the size distribution of a certain group or fraction of nanomaterial narrower. By using the method described above, the nanomaterials having sizes in a different range are able to be separated. The principle used for the separation makes use of competing forces between solvation and van der Waals forces, dipole-dipole, dipole-induced dipole, or London dispersion force.

TABLE 1

Example of Nano Material Separation Using the Embodiments of the Present Application.

| Fraction Name | Pressure Range (psi) | Ave. Diameter (nm) | Std. Dev. (nm) | Rel. Std. Dev. (%) | % Mass Recovered |
|---|---|---|---|---|---|
| Original Dispersion | N/A | 5.59 | 2.83 | 50.7% | N/A |
| Fraction 1 | 0-625 | 7.00 | 2.87 | 41.0% | 78.1% |
| Fraction 2 | 625-650 | 4.35 | 0.95 | 21.7% | 11.9% |
| Fraction 3 | 650-700 | 3.95 | 1.10 | 27.7% | 2.7% |
| Recursive 1 | 625-650 | 4.35 | 0.95 | 21.7% | 11.9% |
| Recursive 2 | 625-650 | 4.50 | 0.89 | 19.8% | 28.8% |
| Recursive 3 | 625-650 | 4.58 | 0.83 | 18.1% | 33.5% |

Figure 3:
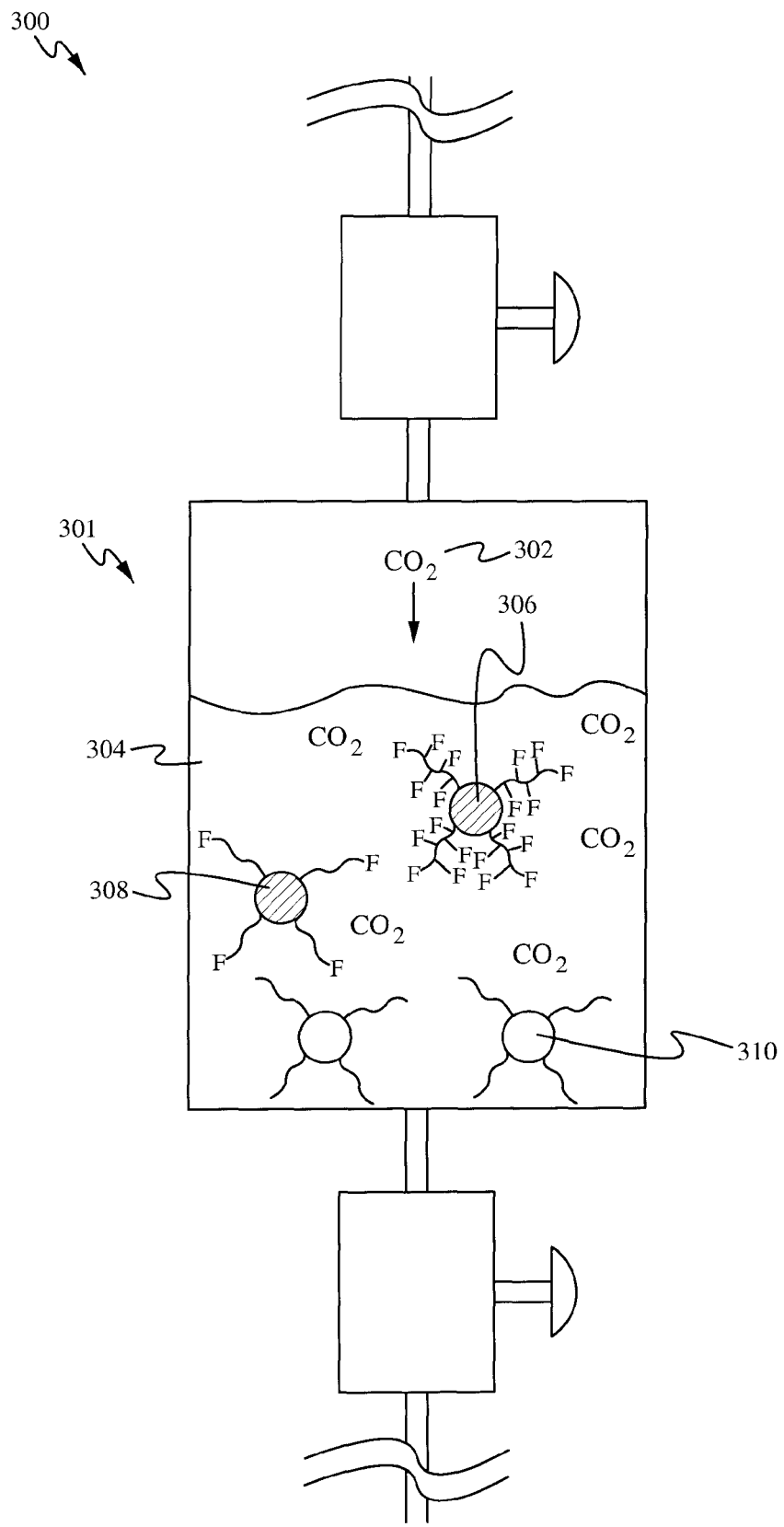
FIG. 3 illustrates a method of nanomaterial separation 300 using functional groups of the nanomaterials as a controlled factor for separation in accordance with alternative embodiments.
Figure 4A:
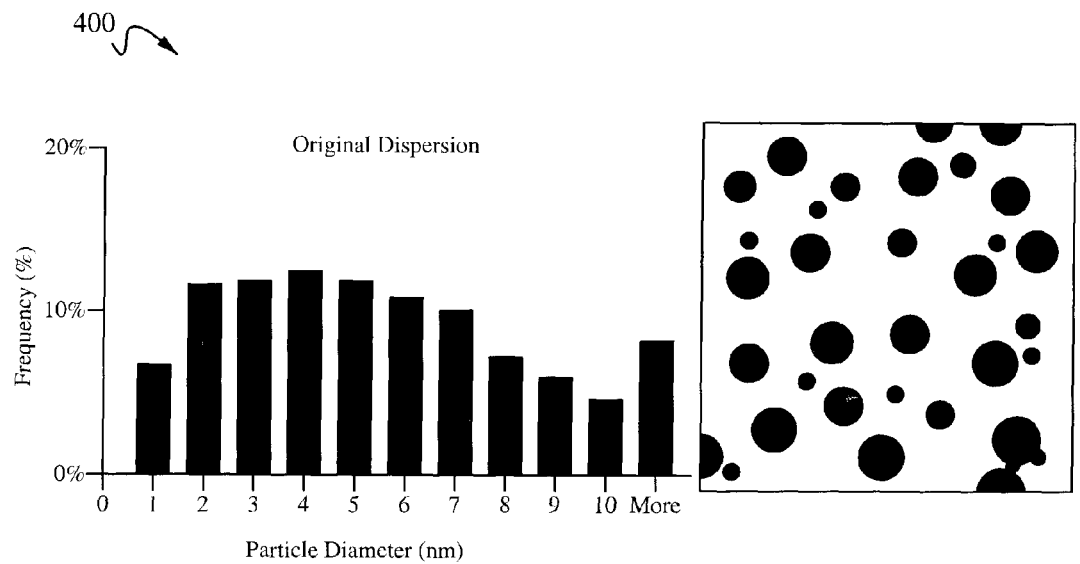
FIGS. 4A-4D show an experimental result 400 using the nanomaterial separation system 100 and method 200 in accordance with some embodiments.
Figure 4B:
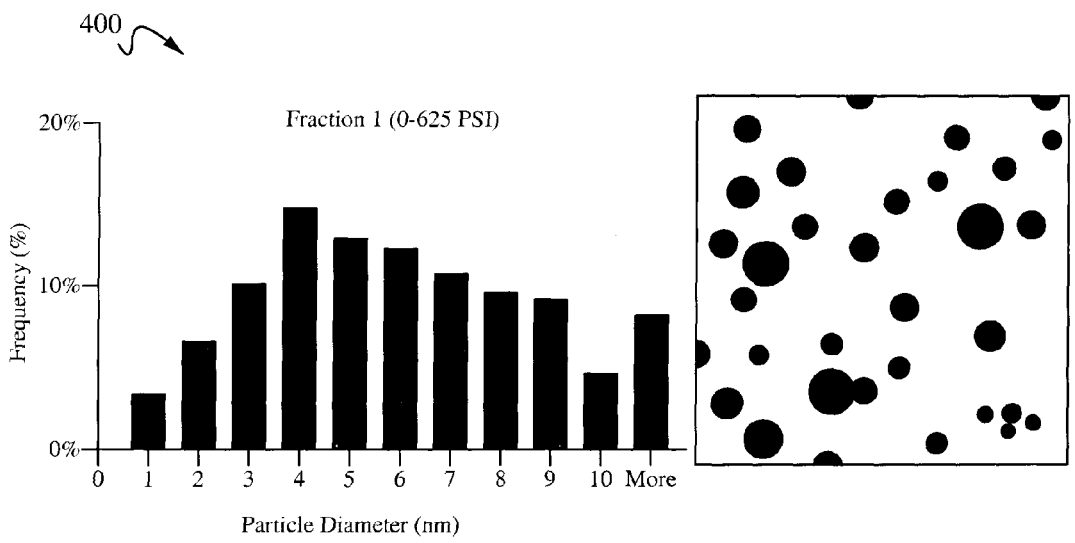
Figure 4C:
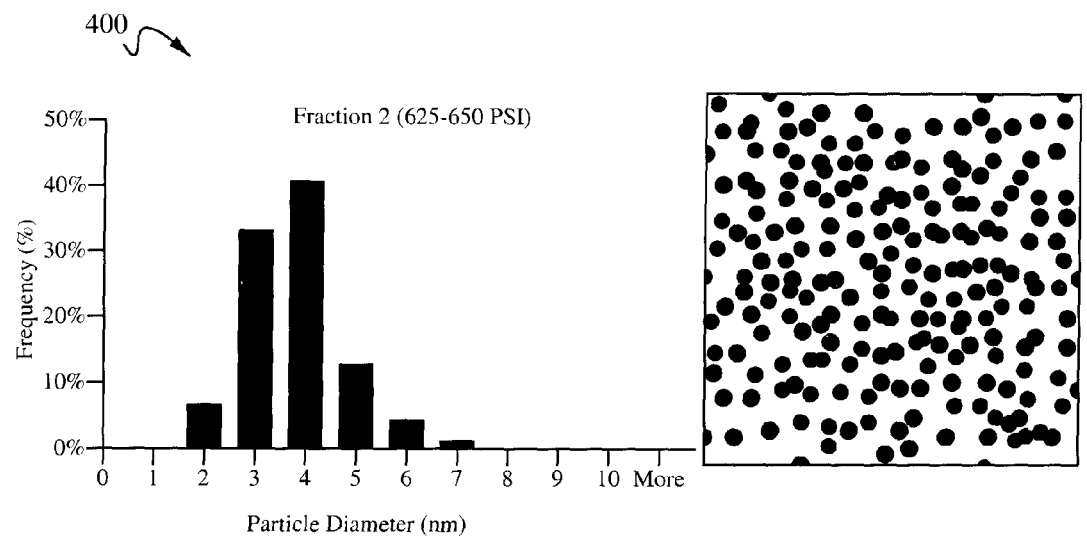
Figure 4D:
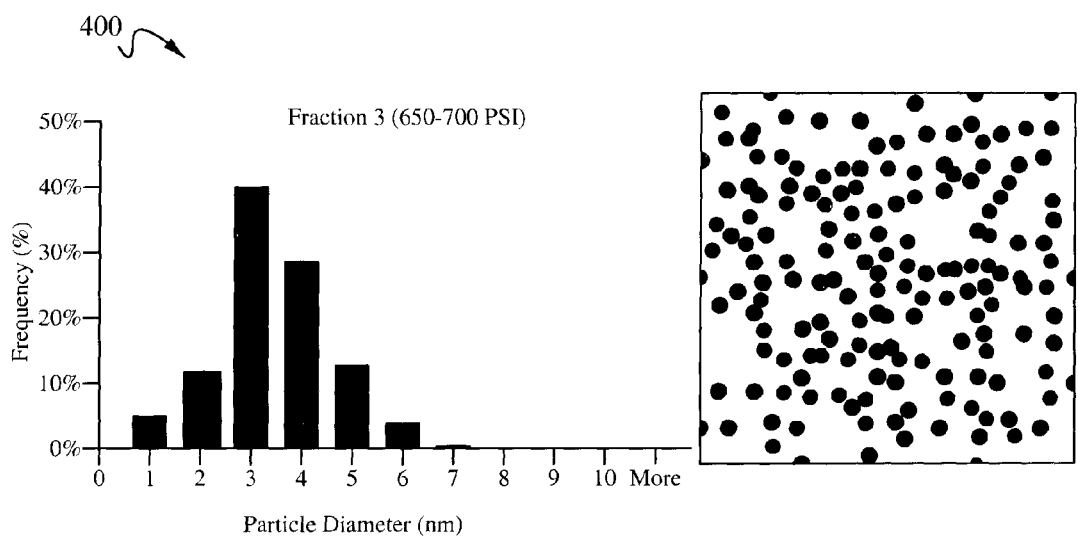
Figure 5A:
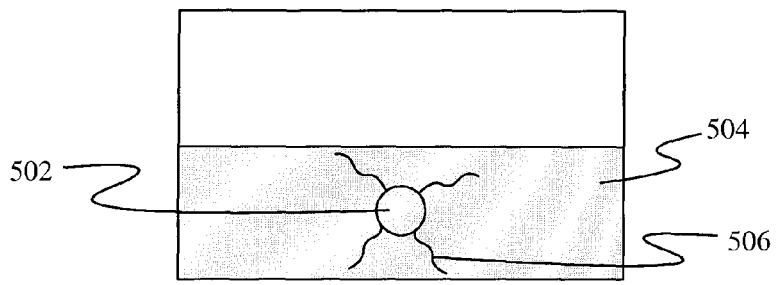
FIGS. 5A-5E show a graphic illustration of the $CO_2$-expanded liquids for nanoparticle size-separation system 500.
Figure 5B:
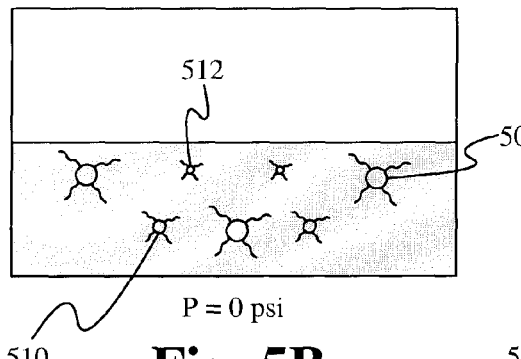
Figure 5C:
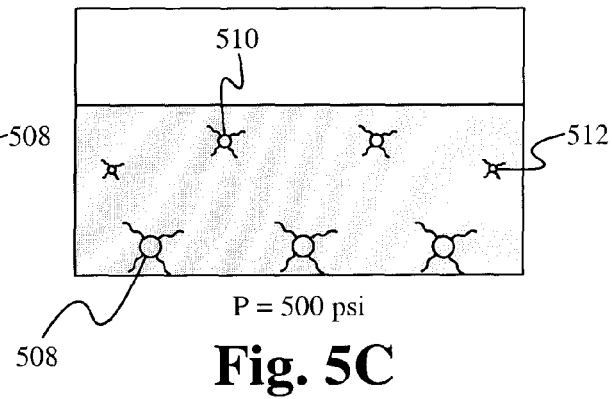
Figure 5D:
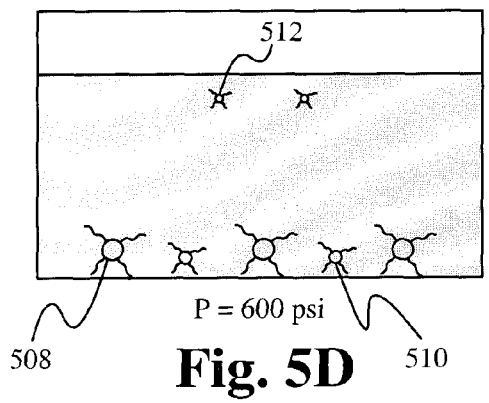
Figure 5E:
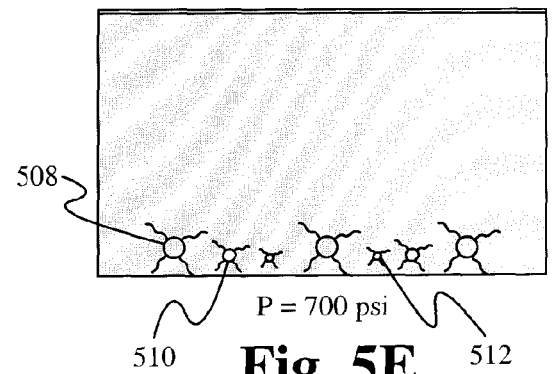

FIG. 3 illustrates a method of nanomaterial separation 300 using functional groups of the nanomaterials as a controlled factor for separation in accordance with alternative embodiments. The vessel 301 of the nanomaterial separation 300 is pressurized with a antisolvent, such as $CO_2$ 302. The nanomaterial 310 does not contain fluorine atoms within the polymer tails, so the nanomaterial 310 is first precipitated out when a low amount of $CO_2$ is added into the vessel. The nanomaterial 308 contains some amount of fluorine atoms on the tails of the nanomaterials, so the nanomaterial 308 is precipitated at a higher pressure of applied $CO_2$. The nanomaterial 306 contains more fluoride atoms than the nanomaterial 308, so the nanomaterial 306 is precipitated at the higher pressure of $CO_2$ than the precipitation pressure of $CO_2$ applied to the nanomaterial 308. The method of nanomaterial separation 300 is able to be applied on the nanomaterial separation system 100 described above. As such, the nanomaterials 306, 308, and 310 are able to be collected in separate vessels. A person of ordinary skill in the art would appreciate that other functional groups are applicable using the method described above. For example, the functional groups, such as thiol, hydroxyl, halogen, and hydrogen bonds are able to be used as the controlled factor for separation.

Similarly, a person of ordinary skill in the art would appreciate that other chemical and physical properties are able to be used as the controlled factor for separation. For example, the controlled factor for separation could be the competing force between ionic/hydrogen bonds with the solvent strength when antisolvent is pressurized. Other properties, such as optical features of the nanomaterials, are all also applicable. For example, the geometry of the nanomaterial clustering is able to be used as the controlled factor for separation. The chirality of the nanomaterials is able to be used as a controlled factor by varying the chirality of the solvent and the pressurized gas. Other chemical and physical properties of the nanomaterial are also able to be used as the controlled factor for separation. Biological or other materials and chemicals are able to use the present application for separation. For example, proteins, DNA, and RNA separations are also applicable.

Table 2 shows comparison data of nanomaterial separation using a spiral tube apparatus described in related U.S. Pat. No. 7,384,879. The spiral tube apparatus is different in structure and function from the structures and functions of the nanomaterial separation system 100 provided in the present application.

The data on percent mass recovered of Table 1 is obtained by using Thermogravimetric Analysis (TGA). TGA analysis was performed on a 1 mL sample of each fraction in order to determine the concentration of each recovered fraction. The result showed that only a 5% mass loss was found on each run, which can be attributed to a portion of precipitated particles not re-dispersing when washed with hexane.

TABLE 2

Spiral Tube Apparatus

| Fraction Name | Pressure Range (psi) | Ave. Diameter (nm) | Std. Dev. (nm) | Rel. Std. Dev. (%) |
|---|---|---|---|---|
| Original Dispersion | N/A | 5.0 | 1.3 | 26.0% |
| Fraction 1 | 0-625 | N/A | N/A | N/A |
| Fraction 2 | 625-650 | 5.0 | 0.5 | 11.0% |
| Fraction 3 | 650-700 | 3.4 | 0.7 | 20.6% |
| Recursive 1 | 625-650 | 5.0 | 0.7 | 13.1% |
| Recursive 2 | 625-650 | 5.0 | 0.5 | 10.0% |
| Recursive 3 | 625-650 | 4.9 | 0.4 | 8.1% |

The nano material separation system and method disclosed in the present application is advantageous in many ways. For example, the nano material separation system and method provides individually detachable and sealable separation vessels. The detachable and sealable separation vessels allow individual treatment of the samples at each stage, which eliminates the possibility of contamination of interconnecting chambers either caused by expanded solvent/antisolvent or the flowing of the pressurized gas or the antisolvents. Further, the vessels of the nanomaterial separation system 100 are able to be detached and individually sealed in preparation, which allows the potentially bio-hazardous nanomaterial samples to be loaded, dissolved or dispersed, and sealed in an isolated environment before the vessels are connected to the other parts of the nanomaterial separation system 100. Similarly, the detachability and individual sealability of the vessels of the nano material separation system 100 allows air sensitive nanomaterials, such as transition metal nanoparticles, to be sealed in an oxygen and/or moisture free or inert environment before being connected to other parts of the nano material separation system 100. The individual sealable vessel of the nano material separation system 100 also allows other parts of the nano material separation system 100 to be purged with inert gases or antisolvent gases to ensure the vessels are oxygen and moisture free without affecting the condition inside the individually sealed separation vessel. Moreover, the nanomaterial separation system 100 allows the injection of re-dispersion fluid into the individual sealable separation vessel to cause re-dispersion of the precipitated nanomaterials without the likelihood of contamination of other vessels or chambers.

FIG. 4 shows an experimental result 400 using the nanomaterial separation system 100 and method 200 in accordance with some embodiments. FIG. 4A shows the original sample of the nanomaterials in an organic solvent before separation. The drawings of FIG. 4A show that various sizes of the nanomaterials are included in the sample. FIG. 4B shows the result of the first fractionation using carbon dioxide which is pressurized up to 625 psi. The drawing of FIG. 4B shows that large size nanomaterials are contained in the sample. FIG. 4C shows that medium sizes of nanomaterials are collected after the pressure is increased from 625 psi to 650 psi of carbon dioxide. The bar figure of FIG. 4C also shows that the majority of the nanomaterials in this group have a diameter of 3-4 nm in diameter. The bar figure of FIG. 4D shows that small sizes of nanomaterials could not be precipitated when 650 psi of carbon dioxide is applied.

FIG. 5 shows a graphic illustration of the $CO_2$-expanded liquids for nanoparticle size-separation system 500. As shown in FIG. 5A, the composition of the nanoparticle size-separation system 500 comprises a separation vessel 501. The separation vessel 501 contains a ligand capped nanoparticle 502, which has ligand tail 506. The ligand capped nanoparticle 502 is dispersed in the organic solvent 504. FIG. 5B shows the status of the sample solution before antisolvent is applied. The sample solution of FIG. 5B shows that large nanoparticles 508, medium nanoparticles 510, and small nanoparticles 512 are evenly dispersed in the organic solvent. FIG. 5C shows that a pressure of 500 psi of carbon dioxide is added to the sample solution. The volume of the sample solution has increased 34% compared to the original solution. The large nanoparticles 508 precipitate out from the solution. The medium nanoparticles 510 and small nanoparticles 512 remain dispersed in the expanded solution. FIG. 5D shows the status of the solution when a pressure of 600 psi of carbon dioxide is applied. In this case, the volume of the solution increased by 53% as compared to the original solution. As shown in the FIG. 5D, large nanoparticles 508 and medium nanoparticles 510 are precipitated out of the solution. The small nanoparticles remain in the carbon dioxide expanded solution. FIG. 5E shows a graphic illustration when the original solution is expanded by 700 psi of carbon dioxide, becoming double its original volume. Under this applied pressure of carbon dioxide, the large and medium nanoparticles 508 and 510 remaining in the solution are precipitated out of the solution. Further, the small nanoparticles are also precipitated out of the solution.

Figure 6:
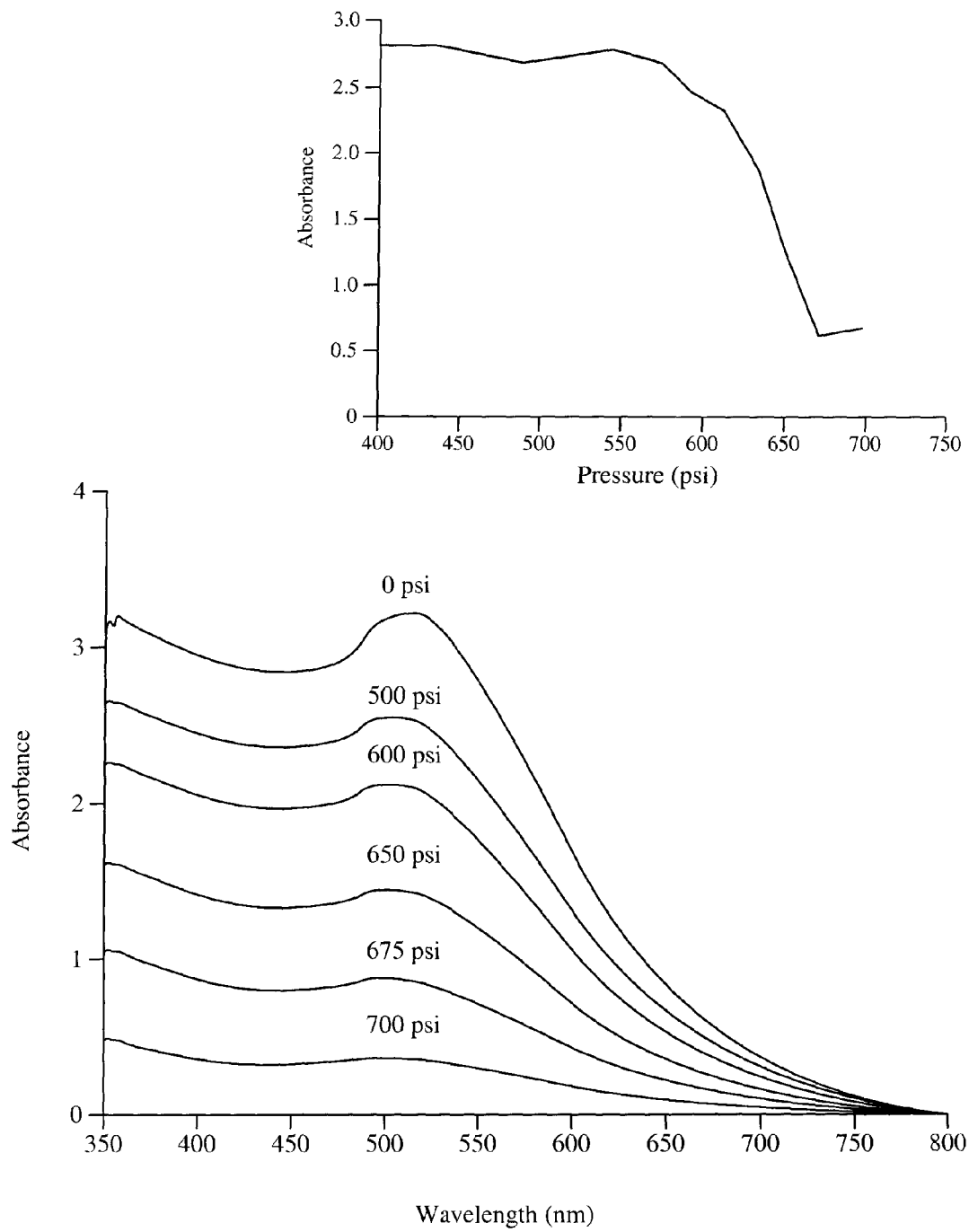
FIG. 6 shows the pressure tunable particle dispersibility.

FIG. 6 shows the pressure tunable particle dispersibility. The decreased absorbance of metal nanoparticles after correcting for the volume expansion of hexane shows that particles are precipitating from hexane by increasing the $CO_2$ pressure.

The following is an example using the methods and apparatuses of the present application. At room temperature, a solution containing 300 mg of 5.59 nm average diameter nanoparticles are dispersed in 20 mL hexane. The solution is loaded into the vessel 104. (FIG. 1) The system 100 is purged with carbon dioxide. The valves 120A-C, 118D, 122, are closed, so the system 100 is sealed. The syringe pump 110 draws carbon dioxide 132 from the antisolvent supplier 130 to pressurize the system 100 to around 625 psi, which is monitored by the pressure sensor 112. A first fraction of the nanoparticles 124 starts to precipitate out from the solution and deposit in the vessel 104. After four hours, the valve 118B is opened, and the remaining solution 126 is transferred to the second vessel 106. The carbon dioxide pressure is raised from 625 psi to 650 psi. At this stage, a second fraction of nanoparticles is precipitated out from the solution 126. The precipitation is able to be observed from the viewing window 130. After four hours, the valve 118C is opened and the gravity of the earth pulls the solution 126 from the vessel 106 to the vessel 108. The particles that could not be precipitated at 650 psi were collected as fraction 3. The precipitation generated at this stage is the third fraction of the nanoparticle separation. The solution is able to be removed from the valve 118D. Each of the vessels 104, 106 and 108 are rinsed with 10-20 mL of hexane respectively while the valves 118B, 118C and 118D are closed.

The second fraction of the nanoparticles is saved for further recursive fractionations. After the first pass, the nanoparticles of the second fraction are re-dispersed in hexane. The re-dispersed second fraction is fractionated with the same pressure to receive a much refined or narrower size distribution of the nanoparticles. In some embodiments, the recursive fractionation uses a pressure close and not equal to the pressure used for the original fractionation to fine-tune the size distribution of the nanoparticles. For example, if the original fractionation receives a fraction of nanoparticles having an average of 4.50 nm in size and a standard deviation of 1.0 nm by using a pressure of 625 psi carbon dioxide. In the recursive process, a pressure of 630 psi of carbon dioxide is able to be applied to receive a group of nanoparticles with an average of 4.40 nm in size and a standard deviation of 0.80. Accordingly, the size selection of the nanoparticles are able to be fine-tuned by adjusting the pressure of the applied carbon dioxide pressure.

The analytical results show that the first recovered fraction of the nanoparticles has an average diameter 7.00 nm. The standard deviation for the first fraction is 2.87 nm. The relative standard deviation for the first fraction is 41.0%. Further, the second recovered fraction of the nanoparticle has an average diameter 4.35 nm. The standard deviation for the second fraction is 0.95 nm. The relative standard deviation for the second fraction is 21.7%. Furthermore, the third recovered fraction of the nanoparticle has an average diameter 3.95 nm. The standard deviation for the third fraction is 1.10 nm. The relative standard deviation for the third fraction is 27.7%.

More experiments have been performed using the methods and systems described in the present application. The detail procedures and results are presented in the following sections.

Experimental Section

Methods and Materials

Chloroform (99.8% purity), silver nitrate (99.99995%) ($AgNO_3$), and tetra-n-octylammonium bromide (98%) (TOABr) were obtained from Alfa Aesar. Deionized ultra filtered water ($D-H_2O$) and toluene (99.8%) were obtained from Fisher Scientific. Hydrogen tetrachloroaurate trihydrate (99.9+%) ($HAuCl_4 \cdot 3H_2O$), sodium borohydride (99%) ($NaBH_4$), hexane (97+%), and 1-dodecanethiol (98+%) were obtained from Sigma-Aldrich. Ethanol (200 proof) was obtained from Pharmco-Aaper. Carbon Dioxide (SCF/SFE grade) was obtained from Airgas. All materials were used as obtained without further purification.

Nanoparticle Synthesis

Dodecanethiol-stabilized gold and silver nanoparticles were synthesized via the two-phase arrested precipitation method developed by Brust et al. and later modified by Sigman et al. This method produces nanoparticles ranging in diameter from 2 to 12 nm with a broad size distribution. A typical silver nanoparticle synthesis is as follows: a solution of 0.19 g of $AgNO_3$ in 36 mL of $D-H_2O$ was mixed with an organic solution consisting of 2.7 g of the phase-transfer catalyst TOABr in 24.5 mL of chloroform. This mixture was stirred for one hour or until the aqueous phase was clear and the organic phase appeared milky. The aqueous phase was then removed and 240 µL of dodecanethiol was added and allowed to stir for 5-10 minutes. A freshly prepared solution of 0.5 g of $NaBH_4$ in 30 mL of $D-H_2O$ was added as a reducing agent and allowed to stir for 4-12 hours. The aqueous phase was then discarded leaving an organic dispersion of thiol-stabilized nanoparticles. Gold nanoparticles were synthesized in a similar fashion, however the 0.19 g of $AgNO_3$ was replaced with 0.36 g of $HAuCl_4 \cdot 3H_2O$, replacing chloroform with toluene, adding the thiol after the 4-12 hours stirring/reducing period, and stirring for an additional four hours after adding the thiol. A large excess of ethanol was added to the organic dispersion of thiol-stabilized nanoparticles as an antisolvent to wash the nanoparticles. The nanoparticles in the solvent/antisolvent mixture were centrifuged (Labnet Hermle Z200A) at 4500 rpm for five minutes to precipitate the nanoparticles. The supernatant, containing the phase-transfer catalyst and the unbound thiol, was discarded. This washing was repeated three times to ensure the nanoparticles were thoroughly cleaned. No liquid solvent-antisolvent size-fractionation was performed at this stage, only cleaning. The nanoparticles were then dispersed in hexane. The hexane dispersions of metallic nanoparticles were used for all experiments.

Size-Selective Fractionation

A cascade-vessel apparatus, schematic shown in FIG. 1, was designed and fabricated to allow for the fractionation of application-scale quantities of nanoparticle dispersions into monodisperse fractions from an initially polydisperse sample by controlling the location of nanoparticle precipitation induced via $CO_2$-pressurization. The primary components of this apparatus are three high-pressure, stainless-steel Jerguson gages (R-20) each with an interior volume of approximately 40 mL, e.g. vessels 104, 106 and 108 in FIG. 1. Side ports were machined into the Jerguson gages to allow delivery of pressurized $CO_2$ to each vessel independently and to prevent vapor blocks. The fittings for the bottom of the vessels were specially machined with a conical shape to prevent entrainment of liquid when drained. Glass-tube inserts were fabricated to fit into the high pressure vessels and make a liquid-tight seal (Viton o-ring) with the fitting attached to the bottom of the vessel. The vessels are connected to each other in series and compartmentalized by high-pressure needle valves which allow for the complete isolation of one vessel from the others. A high-pressure syringe pump (ISCO 260D) is used to controllably deliver $CO_2$ to a desired vessel. Alternatively, a simpler system, without the capability of quantitatively controlling $CO_2$ flow rates, utilizing a $CO_2$ tank (under vapor-liquid equilibrium conditions) and regulator could be used as all experiments are conducted below the vapor pressure of $CO_2$. A pressure transducer attached to the top of the cascade is used to monitor the system pressure. Unlike other current nanoparticle size-fractionation techniques, this apparatus consists of relatively inexpensive and common moderate-pressure equipment.

A typical fractionation was initiated by saturating the apparatus with hexane vapor by rinsing the system with liquid hexane several times and then introducing up to 20 mL of a concentrated nanoparticle-hexane dispersion into vessel 104 (FIG. 1); with all the isolation valves closed the nanoparticle dispersion remained in the top vessel. The system was then sealed and all three vessels were pressurized to a $CO_2$ pressure of $P_1$, determined a priori. The system pressure was carefully controlled by delivering $CO_2$ from the syringe pump until the system reached mechanical equilibrium, which could take as long as 90 minutes depending on the pressure range. During this equilibration period, the largest-sized fraction of nanoparticles, those which could no longer be stabilized in the hexane/$CO_2$ solvent mixture at a $CO_2$ pressure of $P_1$, precipitated from solution (Fraction 1) and adhered to the glass-tube inside vessel 104 via van der Waals interactions. In order to separate the smaller-sized nanoparticles that remained dispersed in the solvent mixture from the larger-sized nanoparticles that had adhered to the glass-tube, the isolation valve 118B separating vessels 104 and 106 was slowly opened to allow the solvent mixture (at $P_1$) containing the smaller, still dispersed nanoparticles to drain (via gravity) away from the larger precipitated nanoparticles into vessel 106. This transfer was performed slowly and at constant pressure ($P_1$) to ensure that the precipitated nanoparticles (largest sized fraction) were not sheared from the glass-tube insert nor re-dispersed due to a change in system pressure, and therefore solvation strength. After the smaller, still dispersed nanoparticles were transferred to vessel 106, the system was again slowly pressurized to an applied $CO_2$ pressure of $P_2$, again determined a priori. During this second pressurization process the largest nanoparticles that were still dispersed precipitated from solution (Fraction 2). The nanoparticles still capable of being stabilized in the solvent mixture at an applied $CO_2$ pressure of $P_2$, were then slowly drained into vessel 108 (Fraction 3) while maintaining constant pressure throughout the system. The isolation valves between each vessel were then closed and the system was slowly depressurized. The glass-tube inserts were then removed from each vessel and separately washed with hexane to collect the precipitated fractions from each respective vessel. Carbon-coated TEM grids were then prepared via drop casting and TEM micrographs were acquired on a Zeiss EM 10 Transmission Electron Microscope and sized using the ImageJ software package.

Figure 7A:
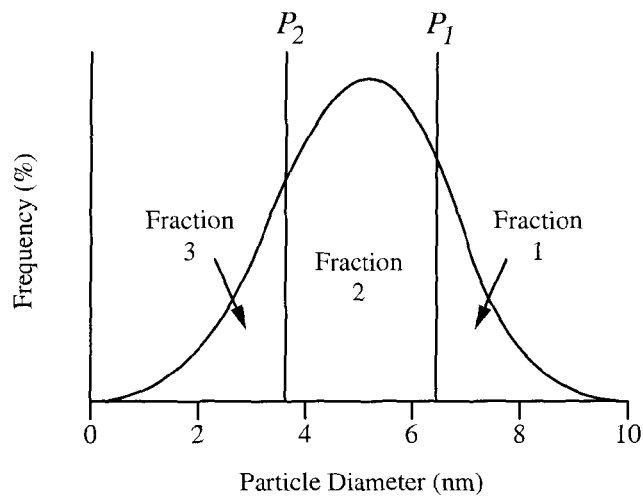
FIGS. 7A-7C demonstrate the concept of targeting mean diameters and size distributions that originates from judiciously selecting the pressure stages, $P_1$ and $P_2$.
Figure 7B:
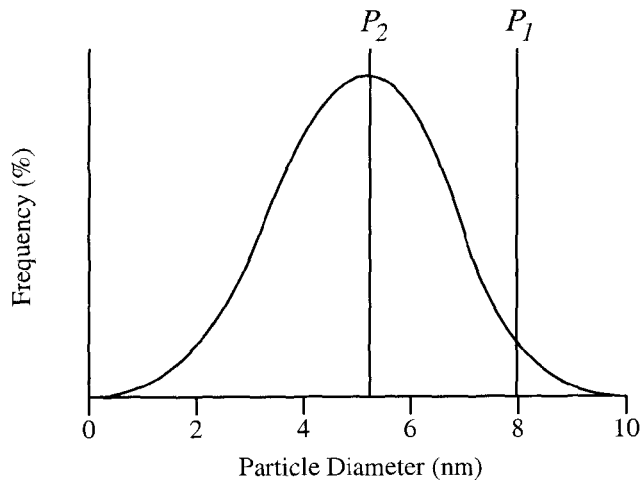
Figure 7C:
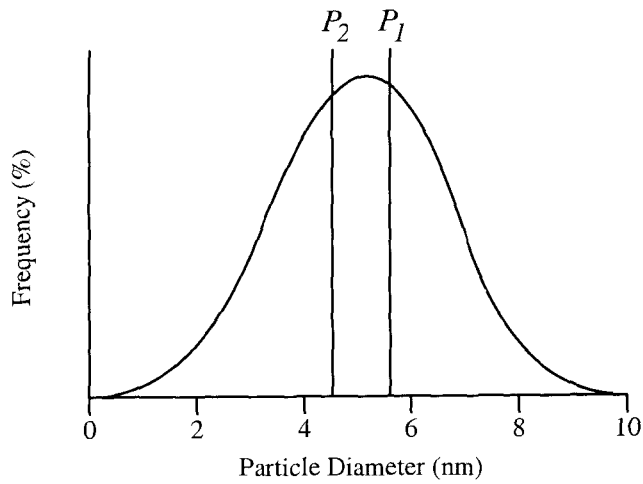
Figure 8A:
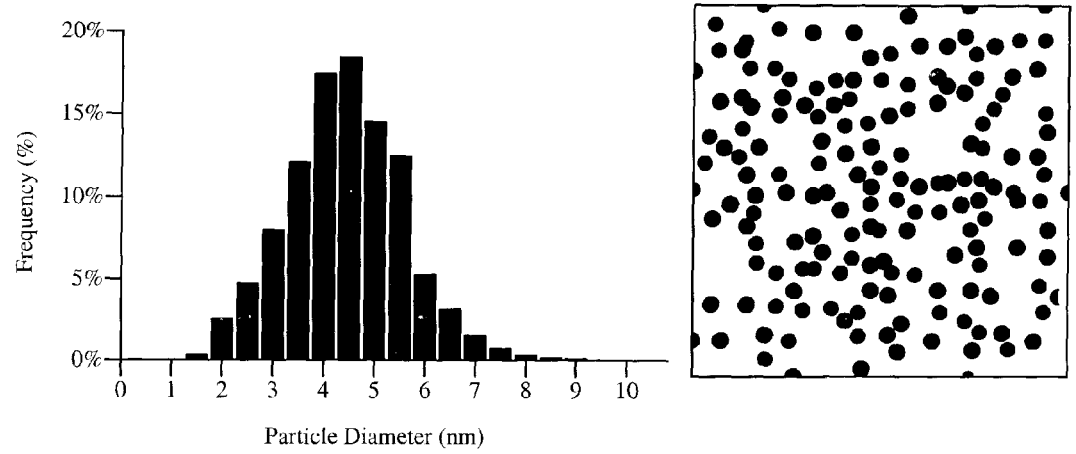
FIGS. 8A-8D illustrate TEM micrographs and size distributions of the original sample and each fraction.
Figure 8B:
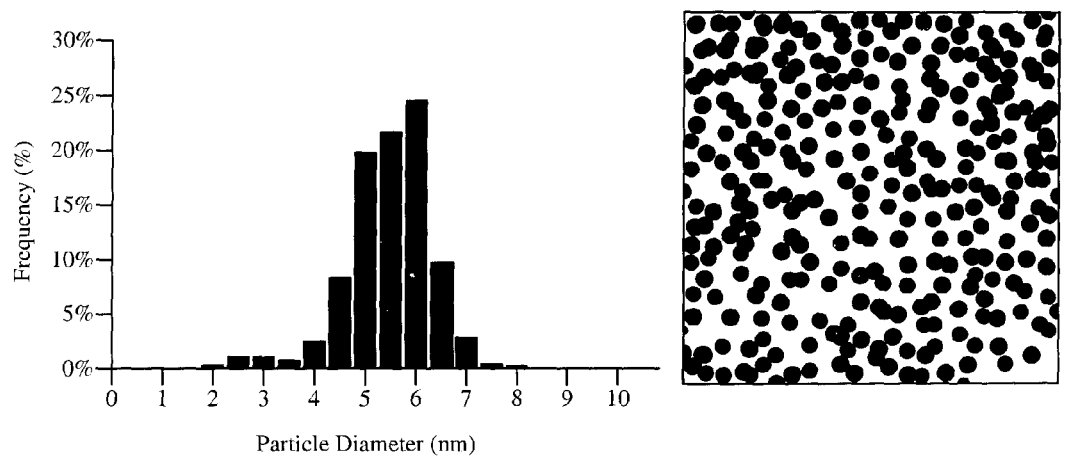
Figure 8C:
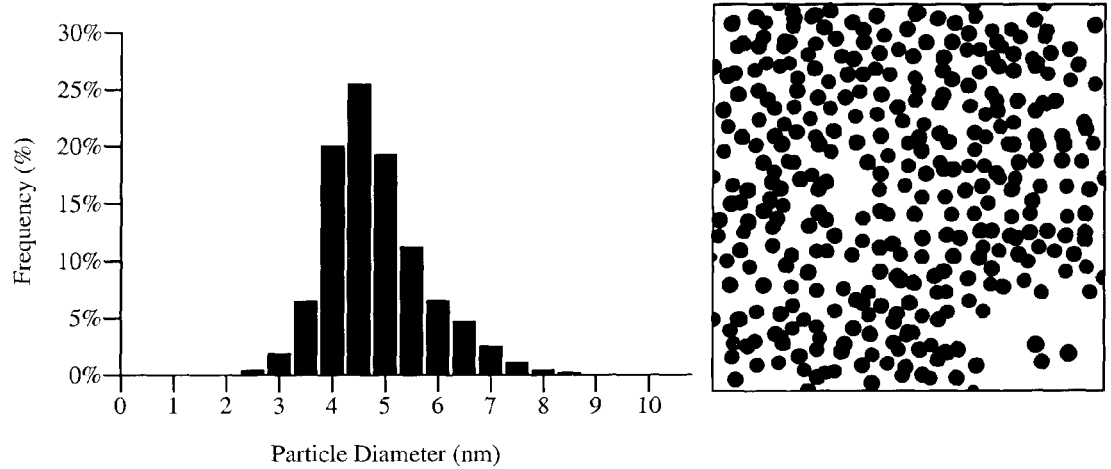
Figure 8D:
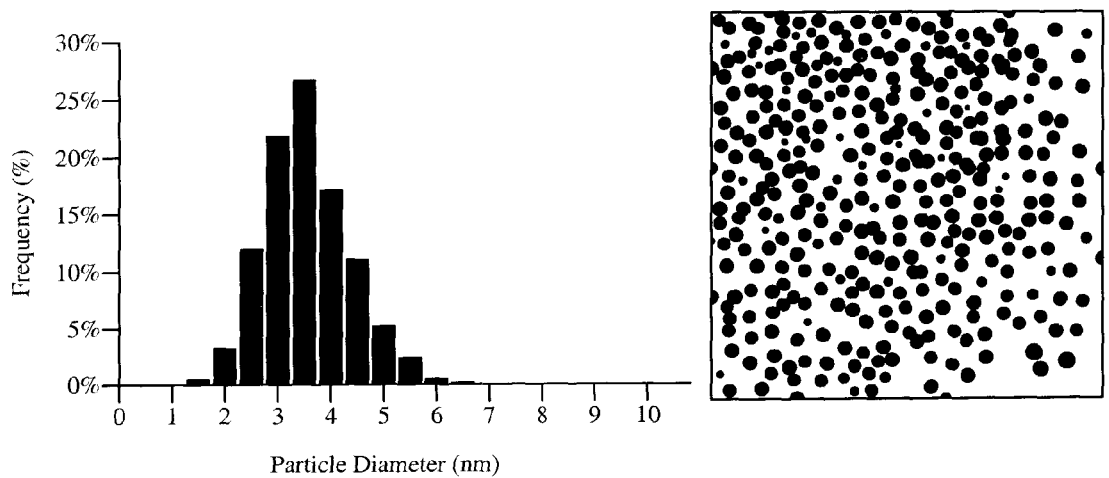
Figure 9A:
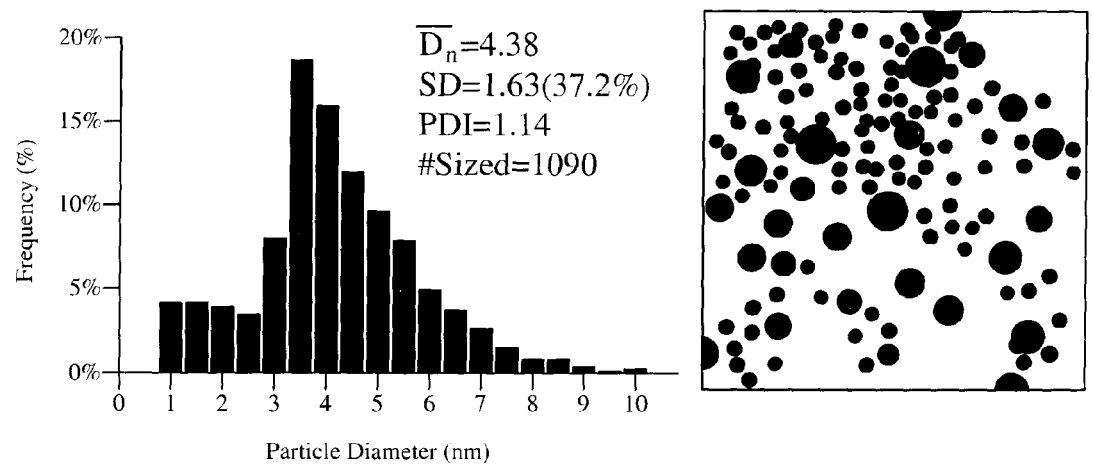
FIGS. 9A-9D illustrate TEM micrographs and size distributions of the original sample as well as the second fraction from each pass.
Figure 9B:
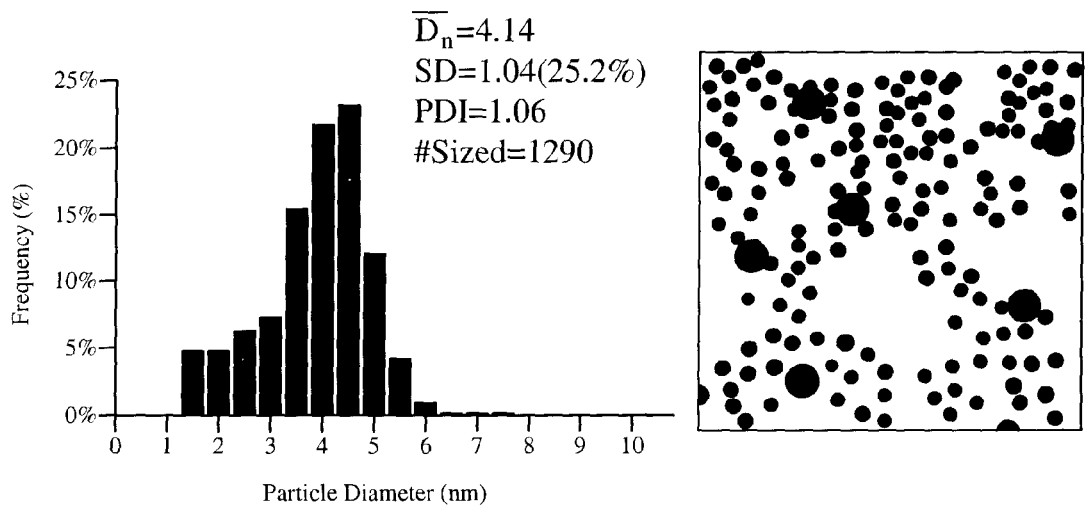
Figure 9C:
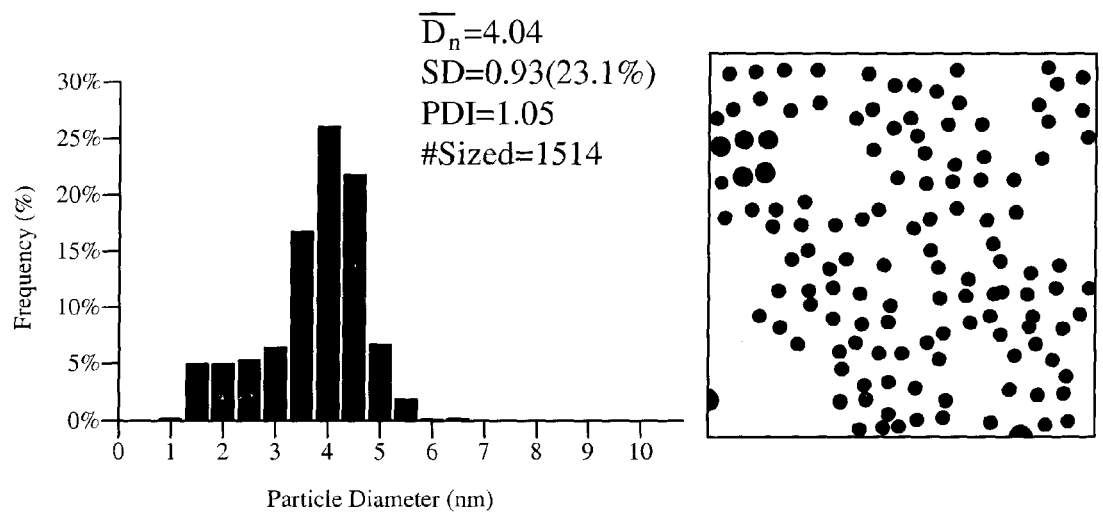
Figure 9D:
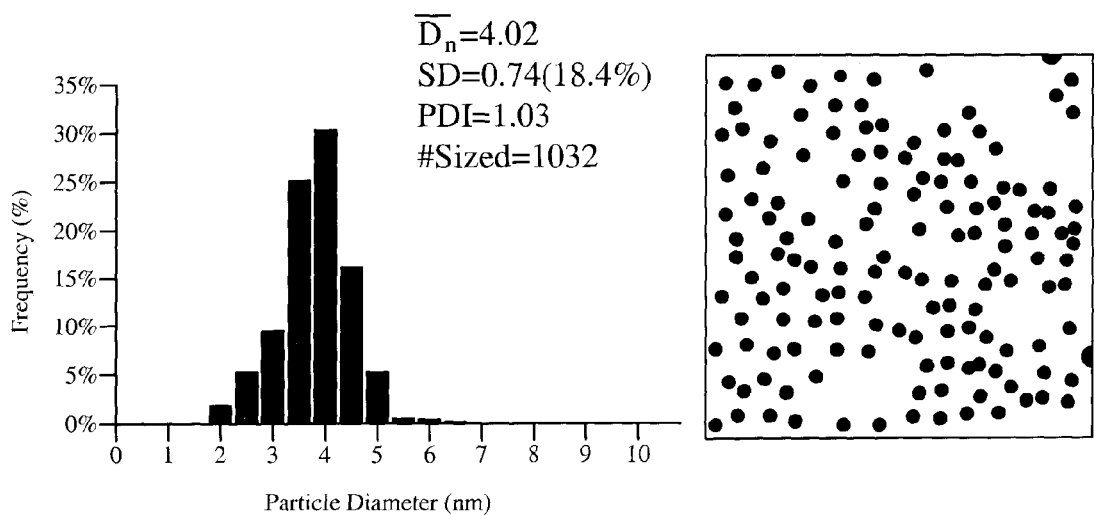

The ability to target mean diameters and size distributions originates from judiciously selecting the pressure stages, $P_1$ and $P_2$. FIG. 7 demonstrates this concept. Through pressurization at two stages, it is possible to make "pressure slices" through a size distribution. Each precipitation makes a cut through the sample's size distribution. As seen in FIG. 7A, $P_1$ corresponds to a threshold nanoparticle size, nanoparticles larger than this size precipitate in vessel 104 (Fraction 1) while nanoparticles smaller than this size remain dispersed and transferred to vessel 106. Fraction 2 consists of the nanoparticles that remained stabilized at $P_1$ but not at $P_2$, or the nanoparticles that exist between the $P_1$ and $P_2$ pressure slices in FIG. 7A. When lower pressures are selected for $P_1$ and $P_2$ (demonstrated in FIG. 7B), the pressure slices shift to larger nanoparticle threshold sizes, thus the recovered fractions have larger mean diameters when compared to the corresponding recovered fraction in FIG. 7A. Likewise, if higher pressures are selected for $P_1$ and $P_2$, the recovered fractions would have smaller mean diameters. When the pressure difference between $P_1$ and $P_2$ is reduced (demonstrated in FIG. 7C), the pressure slices approach each other, thus the fraction recovered in vessel 106 would have a more narrow size distribution and fractions collected in vessels 104 and 108 would have wider size distributions when compared to the recovered fractions in FIG. 7A. An original sample of 20 mL (approximately 300 mg of metal) of dodecanethiol-stabilized gold nanoparticles dispersed in hexane was used for a single pass fractionation. Previous UV-vis studies of gold nanoparticle dispersions in $CO_2$ expanded hexane revealed that nanoparticle precipitation occurs gradually between applied $CO_2$ pressures of 40-49 bar. Pressure intervals for this fractionation were selected as 0-42.7 bar (Fraction 1) and 42.7-45.5 bar (Fraction 2). Nanoparticles that could not be precipitated at 45.5 bar were also collected (Fraction 3). The pressure interval for the first fraction was chosen such that there is a small difference between the pressure necessary to induce nanoparticle precipitation (i.e. the onset of nanoparticle precipitation) and the final pressure of that fractionation stage such that a narrow fraction is obtained. The pressure interval for the second fraction was chosen such that it would provide a fraction with a similar mean diameter to that of the original sample but narrower in distribution. It is convenient to describe an experimental run in terms of the pressure change of the second fraction $\Delta P_2$ ($=P_2-P_1$) and the median pressure of the second fraction $$P_2^m \left( = \frac{P_2 + P_1}{2} \right).$$

TEM micrographs and size distributions of the original sample illustration and each fraction can be seen in FIG. 8. At least 1000 nanoparticles from several different locations on each TEM grid were sized such that a statistically relevant sample of the fraction population was analyzed. A statistical summary of the size distributions of both the original sample and three collected fractions can be seen in Table 3A.

TABLE 3

Statistical summary of single pass fractionations of gold nanoparticles. A) All three collected fractions from one pass, B) second fractions from several different passes, varying $\Delta P_2$ C) Second fractions from several different passes, varying $P'''_2$.

| # | Experiment Pressure $\Delta P_2$ (Bar) | $P'''_2$ (Bar) | Mean Interval (Bar) | Diameter (nm) | Standard Deviation (nm) | PDI | Number of Nanoparticles Sized |
|---|---|---|---|---|---|---|---|
|   | Original | Sample |  | 4.70 | 1.20 | 1.07 | 1218 |
| A | N/A | N/A | 0-42.7 | 5.73 | 0.85 | 1.02 | 1222 |
|   | 2.8 | 44.1 | 42.7-45.5 | 5.02 | 0.99 | 1.04 | 1656 |
|   | N/A | N/A | 45.5+ | 3.75 | 0.81 | 1.05 | 1708 |
| B | 2.8 | 44.1 | 42.7-45.5 | 5.20 | 0.99 | 1.04 | 1656 |
|   | 1.4 | 44.1 | 43.4-44.8 | 5.20 | 0.92 | 1.03 | 1071 |
|   | 0.7 | 44.1 | 43.8-44.5 | 4.87 | 0.66 | 1.02 | 1423 |
| C | 1.4 | 43.4 | 42.7-44.1 | 5.32 | 1.11 | 1.04 | 1242 |
|   | 1.4 | 44.1 | 43.4-44.8 | 5.20 | 0.99 | 1.04 | 1656 |
|   | 1.4 | 44.8 | 44.1-45.5 | 5.07 | 0.71 | 1.02 | 1253 |

It is proposed that a polydispersity index (PDI), similar to that used in the polymer industry, could be used to compare the broadness in size distribution of nanoparticle samples with differing mean diameters rather than relative standard deviation (RSD) since small changes in nanoparticle diameter causes significant changes in RSD. Polydispersity index provides a normalized measure of the broadness of a size distribution. The PDI is the ratio of the diameter-weighted average diameter $\overline{D_W}$ of a nanoparticle sample to the number average diameter $\overline{D_N}$ of a nanoparticle sample.

$$PDI = \frac{\overline{D_W}}{\overline{D_N}} \text{ where} \tag{1}$$

$$\overline{D_W} = \sum_i \frac{D_i^2}{D_i} \tag{2}$$

$$\overline{D_N} = \frac{1}{n} \sum_i D_i \tag{3}$$

where $D_i$ is the diameter of a specific nanoparticle in a sizing sample and n is the total number of nanoparticles in a sizing sample. A truly monodisperse sample, where all nanoparticles are exactly the same size has a PDI of unity, however, as a sample becomes more polydispersed the PDI increases.

As can be seen qualitatively in FIG. 8 and more quantitatively in Table 3A, three very distinct fractions are obtained. In fact, this is the same general result obtained using the previous bench-top (spiral-tube) apparatus even at these larger processing scales. Three very distinct size fractions are obtained. The first fraction of nanoparticles (those collected between 0-42.7 bar) are the largest nanoparticles and the most monodisperse (by PDI) of the recovered fractions due to the small difference in pressure between the onset of nanoparticle precipitation and the end of the pressure interval ($P_1$). The second fraction (those nanoparticles collected between 42.7-45.5 bar) has a similar mean diameter (within 0.35 nm) but narrower distribution when compared to the original sample. The third recovered fraction has the smallest standard deviation of 0.81 nm, an improvement of 32.5% over the original sample showing this method is capable of improving the monodispersity of large quantities of a nanoparticle dispersion. Thermogravimetric analysis (TGA) of the recovered fractions was performed to determine metal concentration of the dispersions. It was found that 98% (by mass) of the metal introduced into the apparatus was recovered after GXL fractionation. It is believed that the remaining 2% was trapped in valves where simple hexane washes were not able to re-disperse the nanoparticles. The entire fractionation process was performed over the course of four hours, limited primarily by the diffusion of $CO_2$ into the organic phase. Along with the single pass results already presented (Table 3A), several additional fractionations were performed where the pressure intervals were varied in order to investigate the controllability of the technique to provide samples with targeted mean diameters and size distributions. First, several fractionation runs (using a sample from the same original nanoparticle dispersion as above) were performed where the pressure difference of the second fraction ($\Delta P_2$) was adjusted while maintaining the median pressure of the second fraction ($P_2'''$). Presented in Table 3B is the statistical summary of these fractionations. As the nanoparticles recovered from the second fraction would be the desired product, only the values for the second fraction are shown in Table 3B. It was found that as the pressure range of the second fraction is narrowed, the recovered fraction becomes more monodisperse (decreasing standard deviation and PDI) while maintaining a relatively constant mean diameter. Similarly, fractionations were performed (Table 3C) in which the median pressure of the second fraction ($P_2'''$) was varied while maintaining a constant pressure difference ($\Delta P_2$). It was found with increasing the median pressure, smaller particles were recovered while maintaining constant monodispersity (PDI remains constant). Thus, it is possible to produce fractions with targeted mean diameters and distributions by simply choosing appropriate pressures. In order to investigate the effectiveness of this fractionation technique, recursive fractionations were performed over the same pressure intervals. Dodecanethiol-stabilized silver nanoparticles dispersed in hexane were fractionated at pressure intervals of 0-43 bar and 43-45 bar. The nanoparticles that could not be precipitated at 45 bar were also collected. These pressure intervals were chosen such that the second fraction would be the narrowest of the three recovered fractions and have a mean diameter similar to that of the original sample. After one fractionation, the nanoparticles collected between 43-45 bar were reintroduced into the vessel 104 and re-fractionated at the same pressure intervals to see if the distribution would change as a result of the recursive (repeated) fractionations. A total of three fractionations were performed at the same pressure intervals, each time collecting and analyzing Fraction 2 (nanoparticles precipitated between 43-45 bar). TEM micrographs and size distributions of the original sample as well as the second fraction from each pass can be seen in FIG. 9. At least 1000 nanoparticles from several different locations on each TEM grid were sized such that a statistically relevant sample of the population was analyzed. Statistical summaries of the size distributions are presented in the insets of FIG. 9. Relative standard deviations are reported in FIG. 9 as the mean diameters are relatively uniform. Therefore, relative standard deviation is an acceptable normalized measure of the broadness of a distribution in this situation.

Each recursive fractionation produced incrementally more monodisperse fractions. The standard deviation of each recovered fraction decreased with each successive fractionation, improving by 36% after one pass, 43% after two passes, and finally, 55% after three passes when compared to the original sample. This is due to the interactions between nanoparticles of different sizes being reduced after each successive fractionation. The fractions become monodisperse enough to begin to locally self-assemble into close packed hexagonal-arrays on the TEM grid upon drop-casting. More than 35% of the nanoparticles, recovered after three passes, are within 5% of the mean diameter which is an improvement over liquid-based solvent-antisolvent fractionation capable of reaching only 30%.

Utilizing the pressure-tunable physical-chemical properties of gas-expanded liquids, application-scale quantities of nanoparticles can be size-selectively fractionated quickly, easily, and precisely, without the use of expensive, specialized equipment and without producing large quantities of waste solvent. Dodecanethiol-stabilized gold and silver nanoparticles can be precipitated by finely tuning the subtle balance between the van der Waals attractive forces and osmotic repulsive forces by simply varying an applied partial pressure of $CO_2$ above the hexane-nanoparticle dispersion. This technique enables the fractionation of large quantities of polydisperse nanoparticles into very narrow (<±1 nm), monodisperse fractions with targeted mean diameters.

In operation, any number and any sequence of the separation vessels are able to be used and added on, because the separation vessels are individually and instantly sealable and detachable. As such, the methods and apparatuses of the present application provide ease to add or remove separation vessels when more or fewer levels of separations are desired.

The methods and apparatuses of the present application provide precise and rapid size selection of nanoparticles from a polydisperse population. In some embodiments, the carbon dioxide based process is faster, less expensive, cleaner, more precise, tunable and scalable when it is compared to the existing processes. The methods and apparatuses disclosed in the present application have potential applications throughout the nanotechnology industry, including optics and imaging.

The methods, systems, and apparatuses provided in the present application have many advantageous aspects when compared to current available technology. For example, the methods and apparatuses of the present application significantly reduce time needed for a size fractionation compared to the traditional antisolvent and centrifugation techniques. Further, the methods and apparatuses of the present application are also less expensive and have a better throughput than traditional chromatography methods. Moreover, the methods and apparatuses of the present application are able to separate and obtain narrower size distributions than the traditional methods. Additionally in some embodiments when the carbon dioxide based methods are used, the methods allow mean particle size and polydispersity to be predetermined by simply choosing the proper carbon dioxide pressurization. Also, the uses of carbon dioxide as the antisolvent is able to reduce operating costs and environmental impact. Similarly, the uses of carbon dioxide are able to reduce post-processing time and costs, because such a method allows simple particle cleaning and solvent/antisolvent recycling.

The term nanomaterials or nanoparticles used in the present application includes any materials in any size. Further, the term nanomaterials include at least nanotubes, fullerenes, quantum dots, nanostructures, and nanopowders. In some embodiments, the present application is applicable to materials having sizes larger than 100 nanometers, for example, fine particles between 100 nm to 2500 nm. Accordingly in some embodiments, the terms "nanomaterials or nanoparticles" are applicable to materials having sizes larger than 100 nm. Further the term "nanoparticle" used herein include the metal cores of the metal aggregation. In some embodiments, the term nanoparticle also include the ligands that capped or around the metal cores.

The term "dispersed" applies to at least the following situations, including when the material dissolved in the solution and when the material disperses and not-dissolves in the solution. In some embodiments, the nanoparticles are ligand capped. The ligand capped nanoparticles are able to have a metal nanoparticle core and polymer ligands. The metal nanoparticle cores do not dissolve in the solvent; whereas, the polymer ligands are dissolved in the solvent. Accordingly, the term "dispersed" used herein include any part of the nanoparticles that do not dissolve in the solvent and/or solution. Further, the term "disperse" also includes all physical conditions that allow the nanoparticle to stay in the solution in a thermodynamically stable manner. The experiments performed under the pressure units psi and bars are used as examples. A person ordinary skilled in the art would appreciate that other ways of determining pressure to be applied are applicable. For example, the pressure controls are able to be in the units of bars, atms, Pa, and Torr.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A nanomaterial separation method comprising:
   a. preparing a first chamber containing a solvent and dispersed nanomaterials;
   b. pressurizing the first chamber with a gaseous antisolvent at a first pressure, thereby causing a first portion of the nanomaterials to separate from a second portion of the nanomaterials;
   c. transporting at least some of the second portion of the nanomaterials to a second chamber; and
   d. re-dispersing the first portion or a second portion of the nanomaterials into a nanomaterial dispersible solution, thereby generating a re-dispersed nanomaterial solution.

2. The method of claim 1 further comprising pressurizing the second chamber fluidly coupled to the first chamber with the gaseous antisolvent at a second pressure, thereby causing at least some of the second portion of the nanomaterials to separate from a third portion of the nanomaterials, wherein the first and the second chambers are individually sealable.

3. The method of claim 2 further comprising pressurizing a third individually sealable chamber with the antisolvent at a third pressure, thereby causing at least some of the third portion of the nanomaterials to separate from a fourth portion.

4. The method of claim 3, wherein the first, the second, and the third pressure are lower than or equal to 860 psi of carbon dioxide.

5. The method of claim 1, wherein the first chamber and the second chamber are individually detachable vessels.

6. The method of claim 1, wherein the solvent comprises a liquid solvent.

7. The method of claim 1, wherein the antisolvent comprises carbon dioxide.

8. The method of claim 1, wherein an arrangement of the first and the second vessel allows the gravity of earth to transfer majority of a solution from the first chamber to the second chamber.

9. The method of claim 2, wherein the second pressure is higher than the first pressure.

10. The method of claim 1, wherein the first chamber comprises a solution having a higher solvent strength than a solution in the second chamber.

11. The method of claim 2, wherein a size of the majority of the nanomaterials of the first portion are larger than the size of the majority of the nanomaterials of the second portion.

12. The method of claim 2, wherein a size of the majority of the nanomaterials of the second portion is larger than a size of the majority of the nanomaterials of a third portion, wherein the third portion of the nanomaterials are obtained by applying a third pressure.

13. The method of claim 1, wherein the nanomaterial disperseable solution is the solvent.

14. The method of claim 1, wherein the solvent is hexane.

15. The method of claim 2, wherein the re-dispersed nanomaterial solution is pressurized by the first or the second pressure.

16. The method of claim 2, wherein the first pressure and the second pressure are between 0 psi to 860 psi of carbon dioxide.

17. The method of claim 1, wherein the majority of the nanomaterials of the first portion contain less fluorine atoms than the majority of the nanomaterials of the second portion.

* * * * *